US009742709B1

(12) United States Patent
Laich

(10) Patent No.: US 9,742,709 B1
(45) Date of Patent: Aug. 22, 2017

(54) METHOD AND SYSTEM FOR PROVIDING INTERACTIVE COMMUNICATIONS DURING AN EMERGENCY

(71) Applicant: NextGen EOC LLC, Winston Salem, NC (US)

(72) Inventor: James Paul Laich, Winston Salem, NC (US)

(73) Assignee: NextGen EOC LLC, Winston Salem, NC (US)

( * ) Notice: Subject to any disclaimer, the term of this patent is extended or adjusted under 35 U.S.C. 154(b) by 0 days.

(21) Appl. No.: 15/398,727

(22) Filed: Jan. 5, 2017

Related U.S. Application Data

(60) Provisional application No. 62/327,155, filed on Apr. 25, 2016.

(51) Int. Cl.
*G06F 15/16* (2006.01)
*H04L 12/58* (2006.01)

(52) U.S. Cl.
CPC ............ *H04L 51/046* (2013.01); *H04L 51/20* (2013.01); *H04L 51/36* (2013.01)

(58) Field of Classification Search
CPC ........ H04L 51/20; H04L 51/046; H04L 51/36
USPC ........................................ 709/219
See application file for complete search history.

(56) References Cited

U.S. PATENT DOCUMENTS

| 7,783,305 | B2 * | 8/2010 | Ross | H04M 3/4936 340/426.18 |
| 8,244,832 | B1 * | 8/2012 | McGuire | H04W 4/20 455/12.1 |
| 2004/0088345 | A1 * | 5/2004 | Zellner | G06Q 50/24 709/200 |
| 2004/0139156 | A1 * | 7/2004 | Matthews | G06Q 30/01 709/204 |
| 2004/0243664 | A1 * | 12/2004 | Horstemeyer | B60R 25/102 709/200 |
| 2005/0015501 | A1 * | 1/2005 | Kaplan | G06Q 30/06 709/228 |
| 2007/0168537 | A1 * | 7/2007 | Misra | H04L 65/1069 709/230 |
| 2009/0172131 | A1 * | 7/2009 | Sullivan | H04M 3/5116 709/219 |
| 2009/0182885 | A1 * | 7/2009 | Sang | G06Q 30/06 709/228 |
| 2011/0117878 | A1 * | 5/2011 | Barash | G08B 21/0211 455/404.2 |
| 2012/0224057 | A1 * | 9/2012 | Gill | G06F 21/55 348/143 |

(Continued)

Primary Examiner — Phuoc Nguyen
(74) Attorney, Agent, or Firm — patent2ip LLC; Tue Nguyen

(57) ABSTRACT

The disclosed invention relates generally to a system, method or apparatus for an improved emergency operations communication system. The object of the present invention pertains to the rapid and efficient collection and dissemination of information between any size population and an emergency operations center and personnel during an event. In one particular embodiment, the invention may provide improved communication, data gathering, analyzation, and organization with a system or method resulting in at least reduced communication time and improved situational awareness between a response center and personnel and discrete unknown or known members of the public.

3 Claims, 12 Drawing Sheets

(56) References Cited

U.S. PATENT DOCUMENTS

| | | | | |
|---|---|---|---|---|
| 2015/0092928 A1* | 4/2015 | Jensen | ............. | G06Q 10/06311 379/45 |
| 2016/0119424 A1* | 4/2016 | Kane | .................... | G08B 27/001 709/203 |
| 2016/0330601 A1* | 11/2016 | Srivastava | .............. | H04W 4/22 |

* cited by examiner

Figure 2A

Questionnaire

200

| ID# | Tor1 | | Active? | ☐ |
|---|---|---|---|---|
| Short Description: | Tornado | 201 | | View History |
| Long Description: | Initial assessment after tornado strike | | | |

QUESTIONS

| Question 210 | | Type 220 | ARV 221 | 230 231 | 240 241 Cat 2 | Cat 3 244 |
|---|---|---|---|---|---|---|
| Are you injured? | 211 | Yes/No | Yes/No | Yes | Yes | No |
| Is there severe bleeding? | 212 | Yes/No | Yes/No | Yes | Yes | |
| Are you able to control the bleeding? | 213 | Yes/No | Yes/No | No | No | |
| Is anyone unconscious? | 214 | Yes/No | Yes/No | Yes | Yes | No |
| Has your home experienced any damage? | 215 | Yes/No | Yes/No | Yes | Yes | |
| What is the level of damage? | 216 | List 222 | Destroyed, Moderate, None 232 | Destroyed 242 | <> Destroyed 243 | |
| Do you have alternative shelter? | | Yes/No | Yes/No | No | Yes or No | |
| Do you have utility services? | 217 | Yes/No | Yes/No | No | No | Yes |
| Which service is not operational? | | List | Electric, Gas, Water | Any | Any | |
| How many days food do you have on hand? | 218 | Number 223 | > 0  233 | Any | < 3 | > 1 |

Actions

| | 250 | | | | |
|---|---|---|---|---|---|
| | Category Label | 251 | Critical | Investigate | No Action |
| | Display on Map? | 252 | Yes | Yes | No |
| | Icon Type | 253 | Red 'X' | Yellow 'X' | Green 'X' |
| | Notify teams: | 254 | EOC, Team 1 | Team 2 | No |
| | Notify type: | 255 | Text | Text | None |
| | Direct by language? | 256 | Yes | No | No |

LANGUAGES 260

EDIT

VALIDATE

SAVE

Figure 2B

| ID# | Tor1 | |
|---|---|---|
| Short Description: | Tornado | 201 |

270  271                                            272                                                    273                                                                                  274                                      275

| SEQ # | QUESTION | LANGUAGE: SPANISH | LANGUAGE: GERMAN | LANGUAGE: CHINESE | LANGUAGE: |
|---|---|---|---|---|---|
| 1 | Are you injured? | ¿Estás lastimado? | Bist du verletzt? | 你受伤了？ | |
| 1.1 | Is there severe bleeding? | ¿Hay sangrado severo? | Gibt es starke Blutungen? | 有严重出血？ | |
| 1.1.1 | Are you able to control the bleeding? | ¿Es capaz de controlar el sangrado? | Sind Sie in der Lage, die Blutung zu kontrollieren? | 你可以控制出血？ | |
| 1.2 | Is anyone unconscious? | Está inconsciente a alguien? | Ist jemand bewusstlos? | 是人潜意识？ | |
| 2 | Has your home experienced any damage? | Se daña su casa? | Ist Ihr Haus beschädigt? | 是你的家损坏？ | |
| 2.1 | What is the level of damage? | ¿Cuál es el nivel de daño? | Was ist die Höhe des Schadens? | 如何受损的是你的家？ | |
| 2.1 | Do you have alternative shelter? | ¿Tiene un refugio alternativo? | Haben Sie alternative Zuflucht haben? | 你有没有替代的住房？ | |
| 3 | Do you have utility services? | ¿Tiene servicios (electricidad, gas, agua) | Haben Sie Utility Service haben? | 你有公用事业服务？ | |
| 3.1 | Which service is not operational? | ?Que no está trabajando? | Welche Service funktioniert nicht? | 该服务无法正常工作？ | |
| 4 | How many days food do you have on hand? | ¿Cuántos días de alimentos tiene usted? | Wie viele Tage von Lebensmitteln haben Sie? | 你有食物的2天以上？ | |
| | | | | | |
| | | | | | |
| | | | | | |

Figure 9

STATUS UPDATES

| ID# | 001 |
|---|---|
| Name | Power outage 910 |
| Memo | Per electric company update |

APPROVED BY
EOC MANAGER

AUDIENCE
- ○ ALL  920
- ○ SELECT CHARACTERISTICS
- ○ SELECT BY GEOGRAPHY

TIMING
- ○ IMMEDIATE  930
- ○ SET DURATION
- ○ SET AUTO START/STOP

RESPONSE
- ○ NONE  940
- ○ ACKNOWLEDGE
- ○ FEEDBACK

MESSAGE
Power will remain out west of the Big River until 6:00am Monday. Next update in 2 hours.
950

Recommended message limit is 160 characters
Messages to be sent based on audience settings: 28,542  960

RESPONSE STATISTICS

| MESSAGES SENT | ACKNOWLEDGEMENTS | PENETRATION RATE |
|---|---|---|
| 25,312 | 19,782 | 78.15% |

ACTIVATE 900
970

Figure 10

BULK INTERACTIVE MESSAGE

| ID# | 001 |
| Name | Injury Survey  1010 |
| Memo | Follow-up questionnaire requested by health department |

AUDIENCE  1020
- ALL
- SELECT CHARACTERISTICS
- SELECT BY GEOGRAPHY

BIM TYPE  1030
- POLL
- ACKNOWLEDGE
- QUESTIONNAIRE

MESSAGE
Additional information is being requested. Please respond "Yes" is you are able to complete a brief survey about your health.

1040

Recommended message limit is 160 characters per text

Number of records based on audience settings:  257,386  1050

RESPONSE STATISTICS

| MESSAGES SENT | ACKNOWLEDGEMENTS | PENETRATION RATE |
| 255,958 | 217,750 | 85.07% |

1060

| CAT 1 – CRITICAL | CAT 2 – HIGH | CAT 3 – NO ACTION |
| 821 | 23,564 | 193,365 |

ACTIVATE

METHOD AND SYSTEM FOR PROVIDING INTERACTIVE COMMUNICATIONS DURING AN EMERGENCY

This application claims priority from 62/327,155, filed on Apr. 25, 2016 entitled "Method And System For Providing Interactive Communications During an Emergency", which application may be incorporated herein by reference in its entirety for all purposes.

FIELD OF TECHNOLOGY

The disclosed invention relates generally to communication systems and more specifically to emergency response communication systems. Particularly, the object of the present invention pertains to a system, method or apparatus that provides rapid, resilient and efficient collection and dissemination of information, data gathering, analyzation, and organization between any size population, including known and unknown members, and an emergency operations center and personnel during an event.

BACKGROUND

In emergency or disaster situations, emergency response operations must be organized, efficient and timely to minimize damage to life and property as well as infrastructure. This includes emergency response operations having the ability to quickly disseminate information and also communicate with population members, of whom may be members of the public. Many of these population members may be unknown individuals and may be varied in many different aspects, such as device usage or network, locations, as well as condition or need. These then provide a problem for emergency operations centers and responders, in that it is very difficult to disseminate and communicate with such a broad population whom may be entirely unknown. In addition, further problems and difficulty arise from a need to quickly react to, classify, store and analyze information as well as provide further information to responders or the members of the population across different devices, networks and location. This is exacerbated too by the need for both downstream, but also upstream communication.

These problems then necessitates that the infrastructure of the response organization network needs more than just the ability to dispatch the closest responder, as today's systems do, but also provide for an accessible information system which may provide for efficient downstream information from the organization, government or other entity to those affected, or upstream, from either bystanders or those affected by the emergency to the emergency response system, and where the information may then be used to improve response and prioritize or send the proper response or responses, as well as provide for other immediate services, as well as future data keeping and tracking etc., as an information database all over a resilient data network.

During an emergency event, obtaining accurate and actionable information from the public may be a top priority for emergency management personnel and as such the present invention may facilitate such. In an embodiment, this information may provide the emergency operations command (EOC) with critical data, also referred to as Situational Awareness (SA), required in providing a more effective emergency response. Emergency events may generally include various groups of persons: The Public— individuals such as local residents and transient populations (including those at their place of employment, those shopping at local businesses, those traversing the area on their way to or from their destination, and tourists) located within the emergency zone, but unaffiliated with an emergency relief agency; First Responders—including EOC personnel, Fire, Police, and other persons providing emergency response activities directly under control of the local EOC; and Outside Agencies—including both government and non-profit relief agencies such as Red Cross and the Federal Emergency Management Administration (FEMA). Emergency events take many forms, which could be natural (such as a hurricane, tornado, flood, or wildfire) or manmade. Manmade events could either be accidental (such as a large industrial accident, train derailment, etc.) or deliberate (bombings, active shooters, etc.). Emergency events affecting a large portion of the population may also be health related, such as pandemic flu (or similar airborne pathogen or contagion).

Emergency events may also have phases associated to them such as: ADVANCED WARNING—a period of time prior to the event where there may be some indication that an event has a high degree of occurring. IMPACT—the period when the emergency event occurs. IMMEDIATE AFTERMATH—the period of time that the public and EOC personnel may be assessing the situation and determining how to respond. RECOVERY AND REBUILDING—the period of time following the stabilization of the emergency event and the EOC has control over the situation. Emergency events, and their associated phases, have varying periods of duration. An emergency event could be either a few days, or could extend for many months or years.

The most generally recognized method for the general public to respond during an emergency may be to call 9-1-1, which is the widely accepted system for requesting emergency services, and generally not for obtaining or providing the EOC with information of a non-emergency nature. A system that allows any unknown member of the public (MOTP) to contact the local EOC directly to provide or receive information that may be directly relevant to them has not been attempted. Moreover, no system exists that allows any MOTP to interact with the local EOC even when the MOTP may be not in the emergency event zone. During an emergency event, the affected MOTP must rely upon generalized announcements provided through various channels such as the Emergency Broadcast System (EBS) that broadcast over regional television and radio, Wireless Emergency Alerts (WEA) that broadcast to all mobile devices within a geographic, or geo-fenced, area (also referred to as Commercial Mass Alert Systems (CMAS)), or through general Public Service Announcements (PSA), among other simple internet broadcasts.

With each of these general announcement systems, the number of persons who have received the message and taken action upon it, the penetration rate, is generally unknown and communication generally only travels upstream. The time between when the EOC determines what information they wish to provide to the public until the actual transmission of that message could be significant depending upon the degree of control that the local EOC has over the aforementioned general announcement systems and the lag time in them. The use of social media during an emergency event has grown significantly in the recent past as a means for the public to share information, including during emergency events. The social media approach to emergency response communications has arisen from the public's ability to access information in real-time, and in the absence of an EOC-controlled system for real-time information. However, the use of social media as an emergency response information tool has proven to be problematic. First, the nature of an unstructured dialogue amongst a large number of users may be challenging to decipher. Assessing exactly what may be being said, who may be saying it, and its relevance to the event at hand cannot be attained unless every message is read. Another significant challenge to using social media as an emergency response communications tool may be disinformation. Incomplete, inaccurate, and misleading information (whether through accident or deliberate action) creates more work for the EOC as they must expend efforts to correct bad information as well as to push out the right message. Yet another significant challenge to using social media as an emergency response communications tool is that the social media landscape is constantly changing. Emergency management personnel that use social media must decide which of the social media channels they will use, have a presence and expertise with each social media outlet, and continuously monitor the application settings as features and functionality evolve.

As the recovery period of an emergency event begins, the public may make their way to shelters or relief centers. The First Responders and Outside Agencies at these shelters generally have little or no information about the people who may be arriving; nor do the MOTP arriving know what services may be available until after they have stood in line and completed some type of questionnaire or intake form. This paperwork may be generally set aside for processing at a later time, and knowing exactly what services may be provided to a specific MOTP may be not a primary consideration during the relief process—generally due to the lack of a system capable of unobtrusively capturing this information in real time, and not because of a lack of interest in the information.

Communications networks often become overloaded in may be affected by an emergency event. Notwithstanding physical damage or destruction of the cellular network, the significant increase in voice and data traffic causes the network to become overloaded and fail. Because Short Message Services (SMS), also known as 'texting', consumes only a fraction of the bandwidth required for voice or data, emergency response agencies such as FEMA encourage the public to "text first". Texting may be the most common and heavily used form of communication. Texting is also a standard feature of nearly every model of mobile cellular device; it generally does not require any additional account or activation; and has the same austere user interface across all device types that may be easily understood and does not require familiarity to use.

The Prior Art systems then do not, at the least, provide for an ability to connect to a unknown public audience as well as personnel, and relay information, data or communication in response to an emergency event, such that aid, information and deployment may be completed efficiently using a cohesive system or method. Thus, there is a need for a response system which may provide for the ability to provide for an efficient, fast and proper response, including updatable records and information on any scale, and of which may include the ability to span actors, agencies, and organizational boundaries, as well as provide two-way information across the response spectrum, from the emergency location, all the way to the response centers and staging or operations using resilient communication networks.

SUMMARY

Disclosed may be devices, methods, apparatus and systems that may provide for an efficient and improved emergency response system. The present invention may provide for an emergency system, such as a communication system, of which may be passive or interactive and of which may provide the ability for those who may be involved in an emergency event to communicate and transfer information to responding organizations or authorities either for non-immediate response or tracking, such as to aid organization of the response, or in some embodiments for immediate emergency response. This includes information travelling upstream (to the responders and EOC, etc.) and downstream (to those affected, such as MOTP, etc.) In a preferred embodiment, the upstream or downstream information may be easily communicated, databased and categorized, quickly and efficiently via any method, such as via SMS networks as well as including known or unknown members of the public.

In the embodiments herein, the invention may provide for at least methods, systems and apparatuses that provide for the ability of communication, the formation of data centers, call centers, command centers and other physical communication devices and systems.

Further, the invention then may provide for an overarching system over any data or communication network which may connect members of the public, responders, EOC, and other organizations and agents, such as with upstream and downstream communication and data. This upstream and downstream data and communication may include ingenious tracking and data processes, structures, recording and storage features, including questions, questionnaires, and a processing ability to analyze responses, such that either further information may be asked, or data may be analyzed automatically or manual and presented to the EOC or operators, such as to track events, or to send responders to those in need. This may be automated through the use of data processing, or may have a manual component.

In addition, the system may provide for interactive maps, and other aids to EOC and responders such that communication and data sharing is eased between EOC, responders, and any personnel, as well as with MOTP. This may include improved organization ability and service success.

The methods and systems disclosed herein may be implemented in any means for achieving various aspects. Other features may be apparent from the accompanying drawings and from the detailed description that follows.

BRIEF DESCRIPTION OF THE DRAWINGS

Example embodiments may be illustrated by way of example and may be not limited to the figures of the accompanying drawings, in which, like references indicate similar elements.

FIG. 2A is an example of a display screen illustrating aspects relating to the creation and maintenance of an interactive questionnaire.

FIG. 2B is an example of a configurable table that allows the IERCS to support questions in multiple languages.

FIG. 9 is an example of a display screen illustrating aspects relating to posting targeted status update alerts, including actionable options.

FIG. 10 is an example of a display screen illustrating aspects relating to creating distributing bulk interactive messages (BIM), including actionable options.

Figure 1:
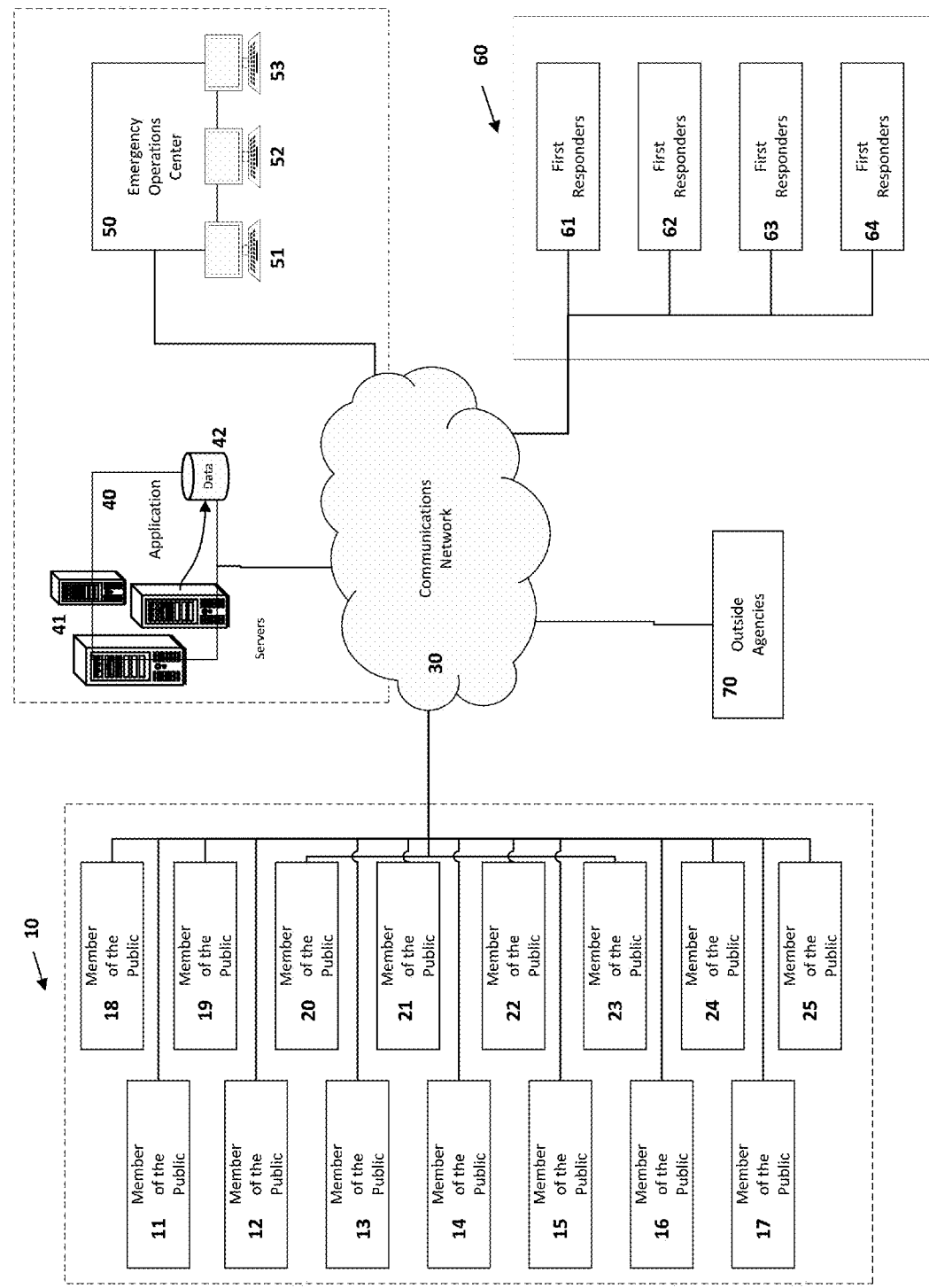
FIG. 1 is a schematic of an interactive emergency response communications system (IERCS) depicting a plurality of MOTP and FROA connecting to the system.

Other features of the present embodiments may be apparent from the accompanying drawings and from the detailed description that follows.

DETAILED DESCRIPTION

Disclosed are methods, apparatuses and systems of which may comprise or provide the ability for organized, reliable and improved communication and communications networks such that within any emergency or event, responders and those affected or within an organization may provide a service, deploy response, or provide for a more thorough or quicker, among other attributes, to a population, such to reduce loss of life and monetary loss to property or infrastructure. An advantageous embodiment may be the object of the respective dependent claims.

This specification describes systems, methods and processes for an interactive emergency response communication system (IERCS). The systems, processes and methods disclosed initiate an emergency response scenario (ERS) and facilitate interactive communications between an unknown plurality of members of the public (MOTP) or any other population, such as within an organization, as well as the emergency operations center (EOC). In some instances, there may also be a plurality of other parties involved in the response, including first responders and outside agencies (FROA), as well as any other type of actor or agency.

In an embodiment, which may be combined with the above and below embodiments, the present invention may describe a communication network or system.

In an embodiment, which may be combined with the above and below embodiments, the present invention may describe a communication and data processing/storage network.

In an embodiment, which may be combined with the above and below embodiments, the present invention may describe a communication and data processing/storage network wherein the network or system may provide for reliable communication in any severity and type of emergency In an embodiment, which may be combined with the above and below embodiments, the present invention may describe a communication and data processing/storage network wherein a MOTP may interact with an Emergency Operations Center and an IERCS via any method, such as wherein the method is a wireless communication method, such as cellular, such as SMS or MMS messages and wherein the communication is interactive In an embodiment, which may be combined with the above and below embodiments, the present invention may describe a communication and data processing/storage network wherein the interaction between the MOTP and the system may provide for processing and classification of the data that the MOTP relays, or other criteria, such as how many members are in the party, the location, etc. Then the system may automatically route emergency appropriate response including providing the data and responses to the responding or authorized emergency management In an embodiment, which may be combined with the above and below embodiments, the present invention may describe a communication and data processing/storage network wherein the IERCS may be stored upon a server, or servers, in one or more locations, In an embodiment, which may be combined with the above and below embodiments, the present invention may describe a communication and data processing/storage network wherein the system creates an interactive incident map and its associated features may be described In an embodiment, which may be combined with the above and below embodiments, the present invention may describe a communication and data processing/storage network wherein a user may distribute a supplemental message or questionnaire to a plurality of MOTP.

The present invention may be suitable for any severity and type of emergency such as a localized or city wide contagion threat to a state wide drought and any other types or size of emergency. It may also include the ability to provide immediate emergency response or, to those who may be not in immediate need of emergency services (i.e. they may be not injured or in a life-threatening situation), but who need to receive relevant information and need to be accounted for.

The invention in different embodiments may be purposefully written, designed, structured or implemented in any apparatus, system or method to not supplement replace, or interact with emergency services communications, such as 9-1-1 or other emergency response systems, and may be as such not be intended to be used for those MOTP and emergency personnel in an emergency event who may be facing immediate life-threatening circumstances. This may be done to reduce liability for any actors, such as the present invention's company, and to in limited feature embodiments, which are not sold or designed with the criteria for life and death scenarios or events. In other embodiments the present invention may then conversely may be purposefully written, designed, structured or implemented in any apparatus, system or method to supplement replace, or interact with emergency services communications, such as 9-1-1 or other emergency response systems, and may the used or intended to be used for those MOTP and emergency personnel in an emergency event who may be facing immediate life-threatening circumstances. In other embodiments, the system, apparatus or method, may be implemented by authorities or other organizations to be a primary response system, especially in large scale disasters and to prioritize response by type, need etcetera.

The present invention may describe systems and processes relating to unrestricted interactive emergency event communications. The systems and processes disclosed herein permit any MOTP who may be in an area affected by an emergency event, to: interact with a centralized interactive emergency response communications system (IERCS) via any broadband or data connection, whether over cellular, hardline, wireless or satellite, and may include data connection, or any other type of connections, of which allows responses to questions relevant to the emergency event that has occurred, and in accordance with business rules; be classified automatically by the application in accordance to the severity of their record based on the combination of their responses; have their record automatically routed to emergency appropriate response personnel including first responders (police, fire), and outside relief agencies based responses, languages, location, or other selection criteria without the need for manual intervention, such as through an automatic software protocol, or routing based on the geo location, response type, or data selections; have their record immediately available to all authorized emergency management personnel across the entire network, including via automatic or manual routing of calls or information; and, request and receive event status updates on-demand that may be relevant to them based upon personal factors including home location, current location, personal or household characteristics, and a response or combination of responses to questions asked of the individual. In general, the subject matter described herein consists of a plurality of databases, comprised of multiple tables and business rules, combined together to form the IERCS.

It is noted that the information stored in any of the aforementioned or later mentioned databases, systems and devices may be transitory, non-transitory or persistent depending on the embodiment and application. The systems, devices and apparatuses may then also read and write between each subsystem and subsequent device in an active network.

The IERCS may be stored upon a server, or servers, in one or more locations, and may be redundantly stored and processed at more than one location, such as many locations, including a combination or solely, secure data centers, personal servers, via cloud computing and cloud arrays, as well as commercial, corporate, or personal data centers, servers or computer, wherein the type and locations of the data centers may be such that the processing and data storage ability may be able to withstand any type of breach or breakdown whether due to hacking or other breaches, or due to the surrounding disaster. The servers may be connected to network communications devices including switches, nodes, routers, etc. These network communication devices facilitate connectivity to cellular networks and the internet—which may be the method of communication between the application and all other users.

In one aspect, the creation and maintenance of Emergency Response Scenarios (ERS) may be described. An ERS may be the combination of questions, responses, and actions that the application may perform during a given emergency event, including the sequence in which they may be performed. An ERS may be unique to the event type, so the application may support the creation of multiple ERS to be stored and staged. Additionally, an ERS may be comprised of multiple components that may be described: ELEMENTS may be general data associated to any MOTP that would interact with the application. These may be generally personal identifying information to help the emergency response personnel in knowing who may be accessing the application. QUESTIONNAIRES may be comprised of a plurality of individual questions, organized into a specific sequence that a MOTP may be asked. The plurality of questions, sequence, acceptable response value (ARV), successor actions, ARV classification, and record classification action (RCA) comprise an emergency response questionnaire (ERQ). ACTIONS may be standard actions that instruct the application to perform a specific action at a given point in the interaction with a MOTP. In a further aspect of the ERS, the method of classifying a completed record from a MOTP may be discussed. Each unique record may be classified by the application, which in turn may direct the application to perform pre-determined tasks, including notifying First Responders and Outside Agencies (FROA). In another aspect of the application, the method for initiating interaction between the application and a MOTP may be described. Access to the application may be controlled by the EOC and once the application is activated the public will be notified of instructions of how to make contact with the application. This may include the application being previously downloaded or stored on the user's device, or wherein the application may be downloaded at the time of use. In a preferred embodiment, this may include SMS functionality, wherein SMS or MMS messages, as well as any "text" messages, or other cellular protocol, on any network able devices, may be enlisted. This may provide for the ability and method that every standard phone, or device, has no need to obtain any additional software in order to be used in the system. This may additionally be any protocol which is installed or provided by the manufacture, or also by the network provider, as well as a later third party programmer. In other embodiments, software may be installed on the device through either the device's OS, or via any other method, including Google play Store, Apple Store, or any other internet or downloadable content store or websites. It is noted that hardware implementation and accessibility may be done via any method, whether it is hardwired or internal input devices such as keyboards or touchscreens, or may be external, such as networked devices, or may be any other method such as voice control, etc. It is also noted that the devices used either by the MOTP or the responder, user or controller may off the shelf hardware and software, or may be a combination or solely proprietary hardware or software. This hardware and software may be designed for such specific use, for instance in a broad base emergency application with MOTP, the device may be used such that off the shelf phones and phones already in the hands of the MOTP are used. In other embodiments, where the application is a custom application, for instance an emergency response application for a company, where the user devise are issued by the company, a proprietary hardware and software may be used.

Additionally, the application may be browser or data based, wherein none or limited data are stored on the user's device, such that many devices may access the data simultaneously. It is noted that the application or MOTP may be achieved over many different devices and data types such that interaction may be achieved through multiple channels, including: email, internet, mobile app, and texting via SMS. All of these channels would provide the same user experience to the MOTP, but data and responses may be suited towards each type, such as low data or bandwidth types such as SMS may be limited to SMS texting as this may be the unique aspect of this invention, in that necessary responses may be automatically or manually chosen for SMS or low bandwidth users, such that even using such methods provides a complete use of the application.

In one aspect of the application, the method for classifying a completed record from the MOTP, including sending alerts to designated FROA's or Emergency Response Groups (ERG's) and posting visual alerts to a centralized digital map, may be described.

In another aspect of the application, the interactive incident map and its associated features may be described. The interactive incident map provides the EOC personnel with a visual display of all records received, along with their classification, provides summary statistics, and allows for an operator to view and take action upon individual records, among another statistic or response data. The display may be instantly configurable to present information available, and may also provide further data from other sources outside the present invention, such that the present invention may compare or use the data, such as weather forecasts, or other information to prioritize or present the information such that the information may be easily or readily be seen and understood in an active context. It is also noted that the information, display or other aspects may be interactive, or not interactive and can be presented in any file format or display type.

The incident map aforementioned, as well as all data, maps, and associated computer renderings may be in any form and via any method shared, sent or shown either within the EOC center, to MOTP, outside organization, etc. This is such that the information brought into the system, as well as compiled or analyzed may be easily provide as benefit to both the internal emergency operations but any outside actors. In different embodiments, permissions and access can be controlled for any outside agency, such that the information can be dispersed to agents at the will of the user, easily, securely and in a controlled fashion. In some embodiments, this can include direct connections between networks and data sharing, and other can also include simple emailing or other communication without sharing networks.

In a further aspect of the interactive map, filtering results of the completed records may be described. Filtering capabilities allow emergency response personnel to quickly identify persons and households of interest based upon changing condition of the emergency event such that responses may be prioritized. In a further aspect of the interactive map, the methodology for creating status alerts may be described. Status alerts allow the EOC to create content-specific information updates to be distributed directly to individual MOTP who may be affected by the emergency event, and who are tracked with the IERCS. When used in conjunction with filters, messages may be delivered to targeted subsets of the registered individuals, providing a much more flexible and powerful tool for reaching those households affected by the emergency event and only because the information may be targeted, direct messages to specific groups or individuals, or other types of messages which may not be desirable to have the entire populace respond to, or know stay selective.

It is noted in a preferred embodiment, the populace does not have a software or application downloaded or installed on the device specific to the emergency operations, but may use a texting application or other preinstalled or factory installed software and communication hardware to interact with the system. This is purposefully designed such that in an emergency event, where data and cellular networks are heavily used, or sometimes nonexistent, especially data connections to download an app, the system only necessitates SMS texting or other simple communication requirements, which are usually the last to be dropped in network use. In some embodiments, there also may be proprietary software that can be pre-downloaded or downloaded after the emergency event has started.

In a further aspect of the interactive map, the capabilities of creating and distributing a supplemental message or questionnaire to a plurality of registered users simultaneously may be described. This capability allows a single operator within the EOC to send a message to any number of persons registered within the application, through a single screen or within a limited number of screens or actions, such as via a drop down or any other menu system, of which may be provided on a limited number of screens or displays. Messages may either be informative and pushed to a targeted audience and require no response; could request an acknowledgement or receipt of the message (polling); or could engage the recipient into completing a supplemental questionnaire (Bulk Interactive Message (BIM)). In the case of polling or BIM, response results may be tabulated and displayed on the message screen.

In some embodiments, where an emergency event scales, either in geographic area, number of people effected or otherwise outstrips the ability of the current facilities and system's ability to react to information, the system may automatically connect with neighboring or other systems to anticipate or meet the demand to continue to function. The cases, data processing classification, or any other aspect may be prioritized to each system based on the need, severity, or any other aspect of the individual record.

In some embodiments all data, records may be stored in transient, non-transient or persistent data at any point in the communication or devices in the system, whether on the user device, in the networks and servers or in the processing databases, such that if the systems or devices crash, shutdown run out of power, or otherwise fail, then the data is not lost and can either be resent or sent later, or be started where the MOTP left off, instead of losing the data. This may also be such that a user may start an entry on one device and be able to easily pick up the data on anther to update records, or complete the entry.

In some embodiments, the present system allows for bug tracking and error reporting, such as in the classification system but also may be at any given point within the system. In some embodiments, if there is a bug then the users or data may be moved or transferred to another method to reduce downtime or loss of service. For instance if the SMS input on the server is overloaded with entries, then it may be better than to completely overload, to route the users to other entry methods if available.

In another aspect of the application, the ability for an emergency management operator to assign a MOTP record to a FROA for follow up may be described. A record that meets certain criteria and becomes relevant to the EOC operator may be assigned to an individual or group for action. The methodology for assigning a record for follow-up may be described. In another aspect of the application, an emergency service interface may be described. This interface, when used, allows emergency relief personnel, FROA, to record the assistance and services that may be provided to a MOTP in real time, and allows for the EOC to be able to have accurate information regarding the throughput of the number of people being processed at a given relief center, and may for future use, be able to provide a picture or understanding of those still in need, those who have been responded to, and response may not be necessary or those in need of additional response or aid.

A number of embodiments of the invention may be described. Nevertheless, it may be understood that various non-emergency uses of the application would be suitable where a centralized party wishes to engage in mass simultaneous conversation with the public and do not depart from the spirit and scope of the invention. The details of the embodiments of the invention may be set forth in the accompanying drawings and the description below. Other features, objects, and advantages of the invention may be apparent from the description and drawings, and from the claims.

FIG. 1 illustrates a schematic of an example of an IERCS. A representation of the centralized application may be included in the dashed-line rectangle 100. The IERCS may be comprised of a centralized application 40 as well as the EOC 50. The applications and EOC data and processors may exist on a cloud network, or intranet, including localized and array devices, in a single location or a plurality of locations such that the ability for the EOC and application process and store may be redundant and unable to be shut down or stopped by any localized events, such as disasters or power outages, among others. The two entities may or may not be physically located together, as their proximity to one another may be not a factor to the operation of the system, and may be connected via any method such as satellite, land line data connections, or radio connections, as well as direct data transfers such as line of site transmitters and receivers, etc. The centralized application 40 may be comprised of various computing devices, including servers 41 handling required computing functions, as well as centralized data storage 42 on electronic media storage devices, of which may be transitory, non-transitory or persistent but also may have redundant storage or cloud storage, among others. The EOC 50 may also contain a variety of computing devices 51, 52, 53 that provide operators with varying degrees of capabilities for managing the data. The computing devices 51, 52, 53 may or may not be dedicated to operating the IERCS. It may be likely that these devices may be multi-purpose and support multiple programs and functions, of which the IERCS may be but one, such as purpose built device or hardware. This may provide security and resiliency, such that the IERCS may be impenetrable or secure from outside attack or editing. Where the IERCS 40 and the EOC 50 may be not physically co-located, the communication between the application servers 41 and computing devices 51, 52, 53 may be facilitated over commercially maintained communications networks 30 as well as any other network or data transfer network or type. FIG. 1 further displays those parties that may be involved in an emergency event. These include the MOTP 10 which may include a large plurality of unknown individuals such as local residents, transient populations (including those at their place of employment, those shopping at local businesses, those traversing the area on their way to or from their destination, and tourists), here represented within the dashed-line rectangle 10 as MOTPs 11 to 25. It is noted that in addition to the MOTP, there may also be members of an organization, or simply people in an affected area, irrespective of their labeling within the public, an organization, military etc. Additionally, the emergency event also includes individuals who may be providing support efforts for the event. These include first responder agencies 60 comprised of a plurality of individuals (represented by 61 to 64, inclusive) and other outside agencies 70 such as Red Cross or the Federal Emergency Management Agency. This may also include private organizations, such as a private police force or response agency, as well as any other response agent or organization. Other groups may be added as needed through configurable business rules.

FIG. 2A is an example of a display screen of the emergency response questionnaire 200 and a plurality of questions 210 that the EOC wishes to ask of the MOTP once an emergency event has occurred.

Because emergency events may take many shapes of which examples include tornado, hurricane, flood, or fire, the EOC may create and store multiple questionnaires depending on the types of events prone to a given area, or other characteristic labeled to a specific area either given at the time of the emergency, or entered or stored previously, wherein the system is able to use the stored data. For example, an EOC located in a community near the Atlantic Ocean would likely have a questionnaire for a hurricane event, whereas a community located far from the ocean would not. The questions to be asked of the MOTP may be determined by the local EOC, and the questions shown in FIG. 2A are exemplary only, and should not be regarded as all-inclusive. The questionnaires are generally created far in advance of an actual emergency event, but may also be created at the time of the emergency event if that event type had not been planned for, such as through an editable text field. It is noted that the questionnaire may be created or edited locally, within the application, or may be provided by a secondary organization. To create a new questionnaire, a user would open the new questionnaire form 200 and enter a general description of the purpose of the questionnaire including a short description 201 that could be used for easy reference. Next the user would begin to enter the desired question into the grid 210 in the sequence in which they wanted to ask the question. After the initial question may be entered 211, the user would select the type of question 220 from a predefined list. Examples of questions types may be Yes/No 221, a user defined list 222, a numeric value 223, or a range of numeric values also defined by the user. Any of the response may be alphanumeric, binary or any other type of data response, and may in some embodiments be open input or open ended. These types are exemplary only and the user could select other types based upon the business rules and system configuration as well the type of disaster or event. The user would then define, for each question 210 and question type 220, what the Acceptable Response Values (ARV) 230 will be for that given question. With the exception of Yes/No questions, ARVs may vary by question. For example, a question could be "What is your temperature?" and the user would want to define an ARV of type RANGE with values of 95 to 104. But if the question were "What is your height (in inches)?" then the ARVs for that question may be RANGE with values of 48 to 85. The combination of question type 220 and ARV 230 may be to provide a check for valid responses provided by the user and to allow them to correct a non-conforming response. It is also noted that the application may automatically base further questions on prior responses, such as if a previous question has a yes or no answer, the next question or a later question may be dependent on the answer, such as if the question is "Are any family members on any medication?" and the answer is 'No', then the questionnaire moves to the next question bank, but if the answer is 'Yes', the next question may ask "What are the medications?"

In some embodiments, the present invention may utilize a layered triaging questionnaire that intelligently classifies each response and asks the subsequent question based upon the preceding answer. The questions are not strictly binary and allow the questionnaire designer to ask questions that mimic natural dialogue. Once the triage is complete, the combination of responses dictates the auto-notifications and triggering. This may provide the ability for condition based responses, where the questions may change based on the responses of the user, such that more data may be collected for certain circumstances, and may more uniquely mold to the needs of the specific user. Such as if the user responds 'no' to a question regarding having any children, the questionnaire may proceed to the next group of questions, reducing the time wasted by the user. If the user provided a 'yes' response, then the questionnaire may then ask details about the children, such as age, special needs, etc. This type of interactive dialogue is unique from prior art.

FIG. 2B shows an example of the multiple language support configurable table. As each questionnaire 200 is created, the application will automatically create a corresponding language support record, which is accessible from the questionnaire record (see FIG. 2A 260). For each questionnaire 201, the application will auto-populate the sequence number 270 and the questions 271 from the questionnaire 200. The user will then enter the language name and the text of that question 272, 273, 274. There is no limit to the number of languages that the application is able to support 275, as this information is merely sent in the outbound message queue 533 further described in FIG. 5.

It is noted that the aforementioned questionnaire may vary or differ depending on location or type of event, and may also be manually or automatically changed, edited, organized such as specific questions added or removed based on the location, type of disaster, or specific needs of individual or groups of MOTP's such as family size, city location, house size, apartment size, family size, presence of children, etc.

It is also noted that the questions and responses may be manually or automatically parsed by the application, such that specific keywords, criteria or thresholds may be noted to the responders or emergency operations command, such that those with the specific responses may be provided or singled out for response or aid.

Continuing with FIG. 2A, the user then defines categories of responses 240 that they want the application to facilitate. The unique feature of the IERCS may be its ability to process the combination of responses for each MOTP record and to direct action accordingly. As the user answers the first question "Are you injured?" 211, their response directs subsequent questions through business rule configuration. In the immediate example, if a user responds 'Yes' to the first question 241, then the business rules would direct them to the next question relevant to this line of question, as represented by the indented question "Is there severe bleeding?" 212. However, if the user responds to the question "Are you injured?" 211, in the negative 244, then it would not make any logical sense to ask them additional injury related questions 212, 213, 214. Instead, the business rules and system configuration would drive them to the next event question "Has your home experienced any damage?" 215. When the user may be confronted with questions that have user defined values 232, these may appear as a list to the MOTP and they may need to select one of the pre-defined options. These lists may be a drop down selection, or a slider, as well as other input methods. The text response that the MOTP provides may be categorized either by a value 242, or by a logical statement 243, as well as short words, such as HELP for immediate aid requests, or SAFE for no help required. In the present example, an MOTP that may be asked the question "What is the level of damage?" to their home 216, a user that responds "Destroyed" would be categorized in Cat 1 242, but any other response would be a Cat 2. "<>Destroyed" (read 'does not equal "Destroyed"') 243. Logical statements would allow the user creating the questionnaire to more efficiently create category responses instead of listing every value individually. Finally, FIG. 2A shows allows the user creating the questionnaire to define the actions 250 that the application may perform for each given category once the MOTP has completed the questionnaire or interaction with the IERCS. Examples of actions may be shown for each respective category. First, the category label 251 allows the user to create the label they want to use for each category. Whether or not to auto-display the result on an interactive map 252 and how to represent this record 253 may be also examples of options. Next the teams to contact 254, which may be controlled in system tables and configured by business rules and system configuration, as well as the method to contact 255 them, may be options that the user may select. Lastly in some instances, the EOC may want to direct a record to a first responder who speaks the same language 256 in order to provide the best service possible. It may be the combination of responses that the MOTP provides through their interaction that drives their final system categorization. This categorization may also provide the ability for ranking need and forward the request to the proper authorities.

It is noted that the specific response and categorization mentioned, may be of example only and it may be appreciated that items, questions and responses may be changed depending on the location, event and for any other reason.

A complete MOTP record may only be in one category. Upon save of the record, the application may perform a validation of the questionnaire to ensure that all response combinations may be addressed and that no combination may lead to multiple categorization.

In some other embodiments a question if unanswered may automatically be resent after a configurable period of time to have the missing data entered so that categorization may be completed. Also, in some embodiments, the MOTP record may be outside of category, or provided in a different context, such as when another category or context takes precedent over a specific listed category.

An example of the questionnaire categorization for a MOTP who responds follows:

a. Are you injured? No
b. Has your home experienced any damage? No
c. Do you have utility services? Yes
d. How many days food do you have on hand? 2

This would result in the application categorizing the MOTP record as "No Action" because the MOTP appears to be fine and not in need of assistance because all of the responses feel within Cat 3 240. The application would not post on the map, nor would any notifications be sent.

In some embodiments the system provides for which category all or most combinations of responses falls within, and then assigns this category value, as above in FIG. 2A. In this embodiment, each ARV for each question is contained within at least one of the defined categories as set by the user, and that no combination can be within more than one category. Additionally, "validation" may be performed through the 'VALIDATE' button on FIG. 2A. It is noted that some answers, questions and data may be prioritized, and as such the classification may be defaulted to the specific category.

In some embodiments wherein there may be more than one classification further than as found in FIG. 2A, the classification may be provided via another method than predetermined classification, such as a score system, where each response is given a specific value, and if the questionnaire answers responds over a certain amount of value points for a given classification, the user is then placed in an specific category. An example may be in the above category, if the threshold for action is more than ten points, and thus if for the "may you be injured?" is answered yes, the yes value provides 5 points and the no value present 0 points. Then, if another answer, or a combination of other answers, adds more than 5 points together, the threshold for action or categorization is met, and the action is followed. This may provide for an ability to then in some embodiments have an ability for multiple simultaneous questions providing for different classifications.

Another example of the questionnaire categorization for a MOTP who responds to the ERQ may have a different experience based on their responses, and leading to a different categorization:

a. Are you injured? No
b. Has your home experienced any damage? Yes
c. What is the level of damage? Moderate
d. Do you have alternative shelter? No
e. Do you have utility services? No
f. How many days of food do you have on hand? 2

This would result in the application categorizing the MOTP record as "Investigate" as the responses were all within Cat 2 240, and would display them as a yellow 'X' on the map 253, and would send text alerts to members of Team 2 254. The questions 210 (and 211 to 218, inclusive), question types 220, ARVs 230, categorization 240, and corresponding action 250 (and 251 to 256, inclusive) may be all exemplary only to provide an understanding of the functionality. It is noted that every permutation of every element is not represented within this specification and figures, of which the absence of a particular permutation due to the constraints of this disclosure does not diminish the underlying purpose of what is represented here: that a user may create an interactive experience, define response types, to classify how the combination of those responses should be handled, and to direct system-handled actions automatically for each MOTP record independent of one another.

Figure 3:
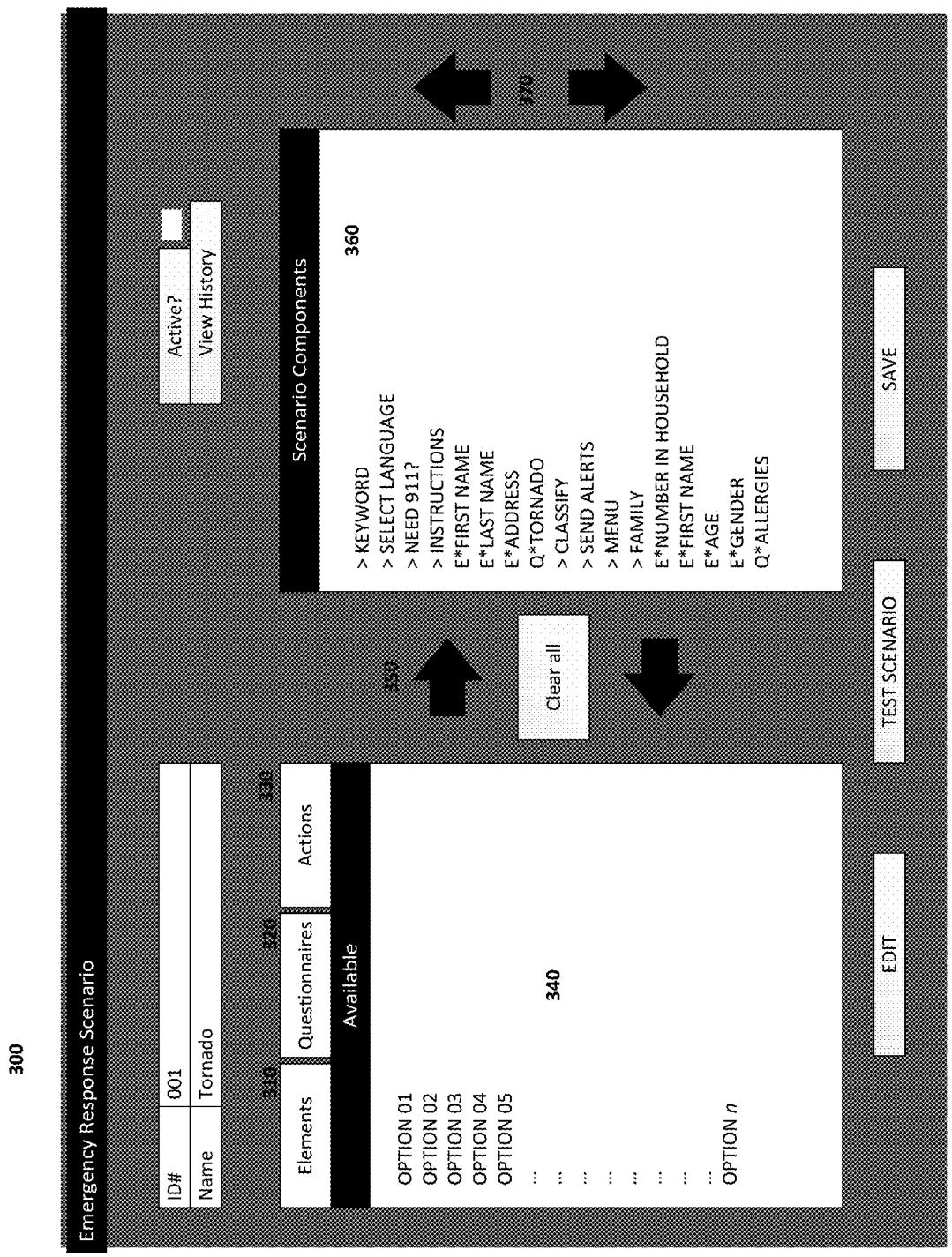
FIG. 3 is an example of a display screen illustrating aspects relating to the creation and maintenance of an emergency response scenario.

FIG. 3 is an example of a display screen of an Emergency Response Scenario (ERS). An ERS may be the complete interactive experience that a MOTP may have during their interaction with the IERCS application. The questions asked within FIG. 2A are only one part of a complete experience, and additional data may need to be gathered from the MOTP in order to provide an appropriate response. An ERS combines multiple components of elements 310, questionnaires 320 and system actions 330 into a unique combination that may be relevant to the given emergency scenario 360. TABLE 1 shows an example list of common data elements 310 that might be requested from a MOTP as part of an emergency response event. Because this list may be user maintained and defined, it is exemplary only, and should not be regarded as exhaustive.

TABLE 1

| Standard Data ELEMENTS |
| --- |
| LAST NAME |
| FIRST NAME |
| MIDDLE NAME |
| SUFFIX |
| DATE OF BIRTH |
| GENDER |
| NUMBER OF HOUSEHOLD MEMBERS |
| ADDRESS 1 |
| ADDRESS 2 |
| CITY |
| STATE |
| COUNTRY |
| ZIP |
| PHONE |
| SECOND PHONE |
| SPOUSE/PARTNER? |
| SPOUSE FIRST NAME |
| SPOUSE LAST NAME |
| SPOUSE PHONE |
| SPOUSE GENDER |

TABLE 1-continued

| Standard Data ELEMENTS |
| --- |
| SPOUSE DOB |
| CHILDREN? |
| CHILD FIRST NAME |
| CHILD LAST NAME |
| CHILD PHONE |
| CHILD GENDER |
| CHILD DOB |
| ANOTHER CHILD? |
| OTHER MEMBER OF HOUSEHOLD? |
| OTHER FIRST NAME |
| OTHER LAST NAME |
| OTHER PHONE |
| OTHER GENDER |
| OTHER DOB |
| OTHER RELATIONSHIP |

TABLE 2 shows an exemplary list of questionnaires 320 that a user may create to reflect the possible emergency events that may be likely to occur for the given region that EOC may be responsible for:

TABLE 2

| QUESTIONNAIRES |
| --- |
| FLOOD |
| HURRICANE |
| SEVERE WINTER STORM |
| TORNADO |
| WILDFIRE |
| ACTIVE SHOOTER |
| POWER OUTAGE |
| CIVIL UNREST |
| PANDEMIC FLU |
| BOMBING |
| ANTHRAX |

TABLE 3 shows an exemplary list of possible pre-defined actions 330 that the user may have created to drive application actions. These could be pre-defined messages, including instructions or help hints, or they could be the trigger for an automated activity to occur, such as to send alerts once MOTP classification has been completed.

TABLE 3

| ACTIONS |
| --- |
| KEYWORD |
| NEED 911? |
| INSTRUCTIONS |
| CLASSIFY MOTP RECORD |
| MENU |
| SEND ALERTS |

It is noted the above is not an exhaustive list of terms, and it may be appreciated that many other terms and questions, as well as answers, may be provided.

Continuing with FIG. 3, once a user has selected either the ELEMENTS 310, QUESTIONNAIRES 320, or ACTIONS 330 sub tabs the options association to the selected option, as depicted in TABLE 1, TABLE 2, and TABLE 3, the options may be displayed in the available field 340, depicted in the ERS screenshot 300 as OPTION 01 to OPTION n, inclusive.

The user may select available options 340 and move them to the selected scenario components 360 either by drag and drop or by selecting the move function 350. Because the selected scenario components window 360 may be a combination of the various types of options, an identifier would be employed to help the user distinguish the original tab from which it was selected. This may be depicted in the exemplary label as 'E*' to represent an ELEMENT, 'Q*' to represent a QUESTIONNAIRE and '>' to represent an ACTION. The order of the components may be arranged either by drag and drop, or by using the order buttons 370. The structure of the ERS screen depicted in screenshot 300 is exemplary only. The construction, arrangement, and options available may differ from this representation, but do not diminish the purpose and function of the ERS screen: that a use may select multiple types of options and combine them into a single unique structured process that would define the MOTP experience as they respond to an emergency event using the IERCS.

Figure 4:
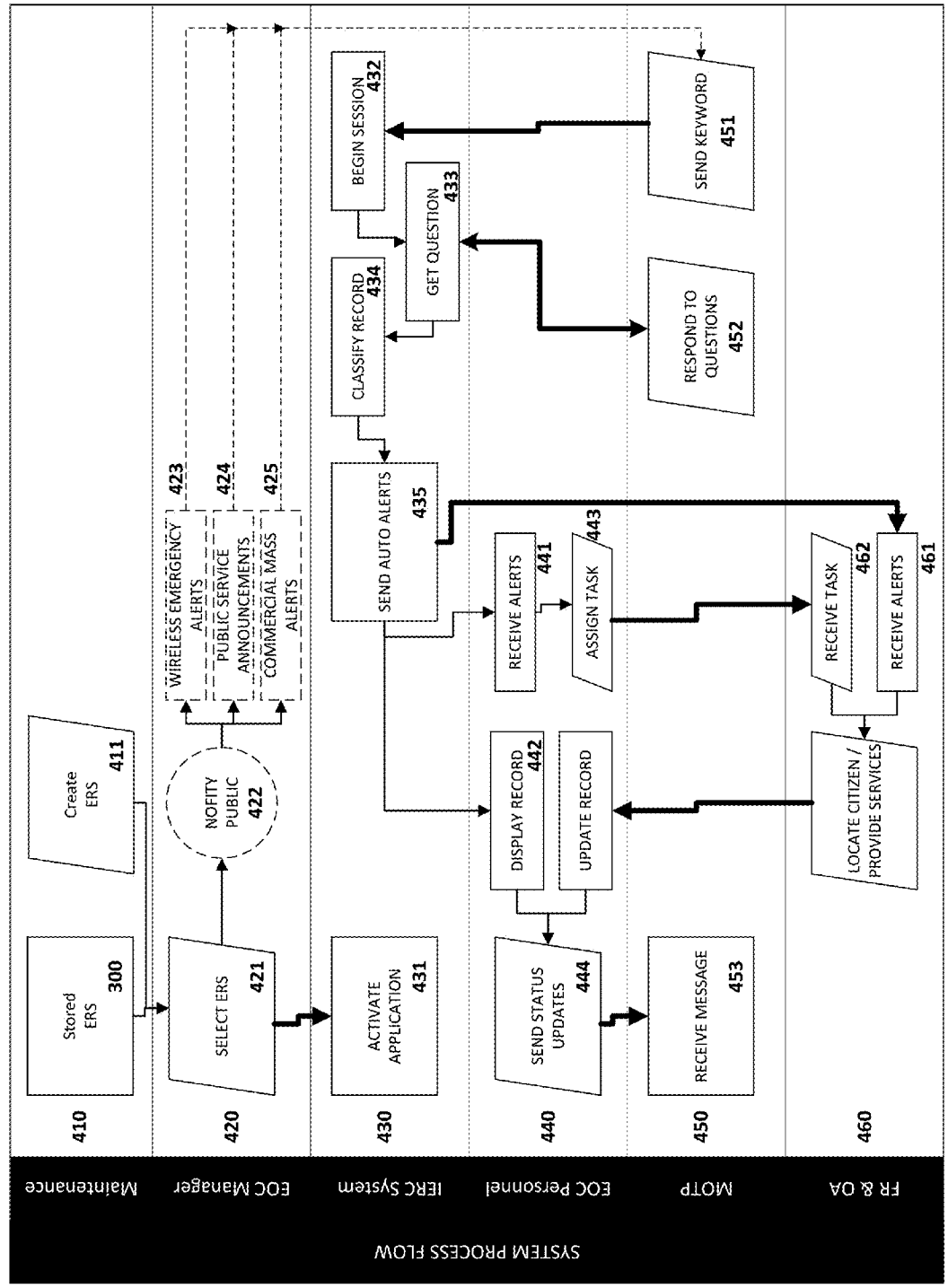
FIG. 4 is a diagram of the process of how the interactive emergency response system will used by the various participants during an emergency event.

FIG. 4 shows a diagram of an example process for an emergency event using the IERCS 100 with all of the various affected groups of users including the EOC Manager 420, EOC Personnel 430, Members of the Public (MOTP) 450, and First Responders and Outside Agencies (FROA) 460. The lane diagram in FIG. 4 shows the process for allowing the MOTP 10 to interact with the central IERCS 40. Upon determination that an emergency event may be declared, the EOC Manager 420 would select the appropriate ERS 421 either from a stored ERS 300, or by having one constructed for this event 411. Once the ERS has been selected 421, the IERCS may be activated 431 by an authorized user with system-controlled access permissions.

Once the IERCS is activated, it is now "live" and may begin processing interactions with the MOTP. Notifications to the public 422 are not handled as part of the IERCS, and may involve various options available to the EOC based upon the event and the systems which they have contracted with. Examples of these tools may be depicted by dashed-line rectangles and include Wireless Emergency Alerts (WEA) 423, Public Service Announcements (PSA) 424, and other Commercial Mass Alert Systems (CMAS) 425. The communication between these systems and the MOTP 450 may be as austere as "Please text REGISTER to 12345 to register with emergency management services for information updates. Do not text this number if you are in immediate need of emergency services." and where 12345 represents an example of a reserved Short Message Service (SMS) short code for this specific EOC and REGISTER may be an example of a KEYWORD that may be used for the selected ERS. Communications between the MOTP and the IERCS may be achieved by numerous methods other than just SMS texting. This could also be achieved via using a custom app that may be stored on the MOTP cellular device. The communications could also occur via a standard website and the user employing a computing device such as a desktop, laptop or tablet device connecting to the IERCS, as well as any other browser based application or software. In addition, this may be a downloaded or OE software, provided when the device is sold may be used. This includes any type of operating system and device, such as a phone, laptop, desktop, mobile device, or even those in a vehicle. That these other interactive options are not discussed in detail does not exclude them from the umbrella of the invention. Where phrases such as "the MOTP texts . . . " appears, they may be intended to be synonymous with "the MOTP accesses a website", "the MOTP accesses the IERCS", and "the MOTP responds to an IERCS-generated email". All of these methods may be viable communications modes capable by the IERCS but for the sake of brevity, the SMS texting mode of communication may embody all possible communication modes between a MOTP and a system providing an interactive dialogue pertaining to emergency response communications. In other embodiments, this system as noted may be of any type, including other protocols or messaging protocols, as well as broadband data provided over any type of network. It is noted that the MOTP may access the IERCS via any device connected to any communication network operable by the emergency system.

Once the MOTP receives the message and takes action, they may text to the specified keyword to the specified SMS code 451. Once the IERCS System 430 receives the keyword from the MOTP, it automatically creates a record and begins a unique session 432. The application will begin to execute the ERS scenario 360 that was selected from by the EOC 421 and may prompt the MOTP to select the language they wish to complete the questions in (shown as the second option on the scenario components), and if a questionnaire may be part of the scenario, then the application may select the question 433 and send it to the MOTP who may respond to that question 452. The response 452 may be assessed by the system and continue with additional questions as necessary. There are no set number of interactions between the question 433 and the response 452. Furthermore, the MOTP is not required to respond to a question within a given timeframe. Once the question is transmitted 433, the response from the MOTP 452 may be returned at any time. Once the MOTP has completed their questionnaire, the IERCS may classify and categorize the record 434 as well as write the record to the database 42 instantly. In some other embodiments, the system may compile groups of questions and answers before routing, writing to data, or processing. This may be done at any point, either on the user's device, in the network controllers, or in the application on the MOTP. This may be due to the chance of communication drop. In addition the data may be transferred instantly, as entered, such as to reduce the chance the communication loss or to assure as much as the message has been transmitted in case of battery failure or communication or transmission failure. Depending upon the categorization of this MOTP record 240 the application may execute the appropriate actions 250 which may include sending auto alerts 435 to various members of the response teams 441, 461 as well as posting the MOTP record to the map/display in the EOC 442.

Within FIG. 4, manual processes may be depicted by parallelograms and automated processes by solid-line rectangles. Furthermore, with the exception of the lines connecting system processes 432, 433, 434, and 435, very heavy solid lines between two parties represent SMS texts between the parties and processes via the communication network 30. Continuing with the emergency event scenario depicted in FIG. 4, the EOC personnel 440 within the EOC 50 and using a computing device 51, 52, 53 may review the display 442 or respond to an automated alert 441. The operator may then review any record and manually assign it to a FROA 443 for follow-up. The assignment could be a group 60, 70 or to an individual 61, 62, 63, 64 as shown in FIG. 1. Once the assignment has been acknowledged 462, the FROA may take appropriate action, recording information as necessary and posting to the MOTP record. The EOC personnel 440 may be able to provide updates to the MOTP as the emergency event unfolds. They may want to send informative updates to the MOTP. The user 440 would select the STATUS UPDATE screen 444, enter selection criteria and the message and send. The message may be text to the target plurality of MOTP 453. The status update process may be explained in further detail under FIG. 9.

Figure 5:
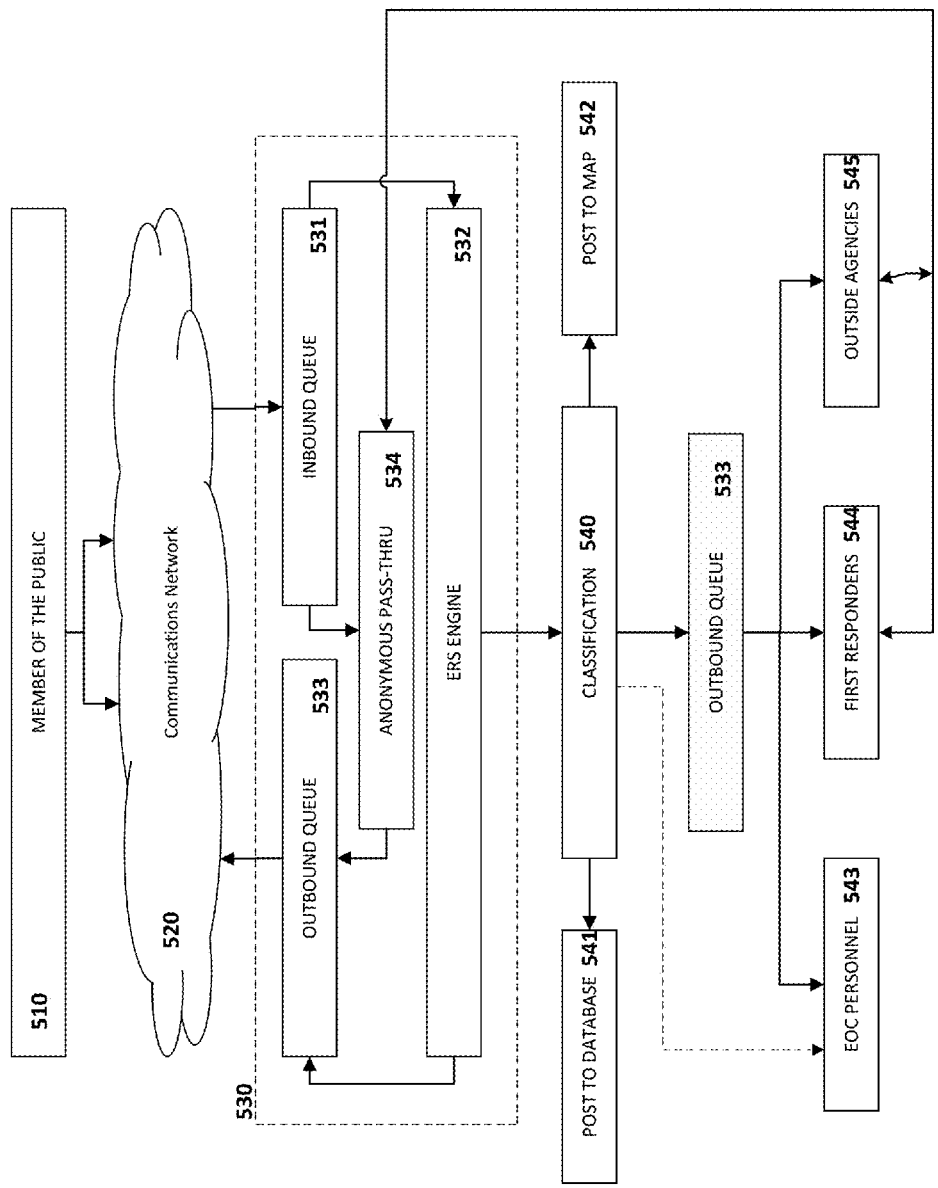
FIG. 5 is a flow chart of the interaction between the MOTP and the application, including the automated classification and distribution of the completed record.

FIG. 5 is a flow chart diagram that further explains the IERCS and emphasizes the automated features between the MOTP 510 and the EOC Personnel 543. The critical component may be the interactive nature of the IERCS depicted by the dashed-line rectangle 530. Once the MOTP receives the information 422 of how to engage the IERCS 430, the MOTP 510 enters the KEYWORD on their cellular device and texts to the SMS short code using available communications networks 520. These messages, likely numbering in the thousands, may arrive at the IERCS and into an inbound queue 531 where it may be analyzed for correctness. If the correct KEYWORD has been received for the current active ERS, the record may proceed to the ERS engine 532 and begin the specific sequence of steps created for this ERS 360. Because the ERS may be unique to a given emergency event, the solid rectangle labeled ERS ENGINE may represent an entire process flow with all possible decision points and options. The ERS Engine's 532 primary function is to guide the MOTP through active scenario. It is noted that the SMS query may be immediately processed for correct format, such that a response may be sent immediately to those with incorrect responses. This may be prior to where later processing and parsing is done for other responses.

Where a response may be present, the response is queued into an outbound message queue 533 (in the language that the MOTP had selected) and texts to the MOTP at the first opportunity 510, and the associated response texts may be returned to the inbound queue 531. It should be noted that while the IERCS will transmit questions to the MOTP in the language 271, 272, 273, 274 of their choice 360, all responses must comply to with the ARVs 230. This cycle may repeat as many times as may be appropriate for the given ERS. However, once the CLASSIFY RECORD action 433, 540 is performed, the IERCS may immediately execute multiple actions including writing the complete record to the database 541, updating the centralized map 542, and notifying individuals and groups 543, 544, 545. The essential benefit of IERCS invention may be its capability of executing thousands of simultaneous interactions between individual MOTP households and the ERS engine. The single block depicting the MOTP 510 may, in fact, be thousands of individual MOTP. Furthermore, the speed at which the IERCS may receive process and respond to the MOTP may be near instant. They also may be processed at different nodes along a network or computer array. Realizing that the communication between the MOTP 510 and the IERCS 530 may be outside of the control of the immediate invention, the area that may be controlled (from inbound queue 531 to outbound queue 533) may be sub-second. Additionally, from the time of MOTP record classification 540 until alert messages may be queued 533 may be equally sub-second. However, because the IERCS experience may vary for each MOTP 510 based on their responses, as well as the reliance on an external communications network 520, there will be no attempt to establish the estimated time of initial interaction 510 to final notification to alerted parties 543, 544, 545. In some instances, where the IERCS and EOC may be co-located, the communication between them may be instant and may be represented by the dashed line between the IERCS 540 and the EOC personnel 543.

It is noted that in some embodiments, the processing may be done on the user's device, such as checking for proper responses, such as formatting. In addition a database, algorithm, or otherwise, which may be periodically updated, or constantly updated, may be compared to the responses, much like the messages are parsed and actioned by the IERCS on the users device. This may allow quicker response times for action items to the user, and may also reduce the amount of data necessary to transfer, such as if questions 1-20 of a particular category are all non-actionable, either a single binary or a single question may be compressed for those questions, such as Questions 1-20—NO—may be transmitted, instead of individual questions and/or answers for those questions. In addition, this may reduce the amount of processing on the system side, reducing queuing time, processing requirements and most importantly speed and throughput for the rest of the responses that meet the criteria to the point of being processed.

Figure 6:
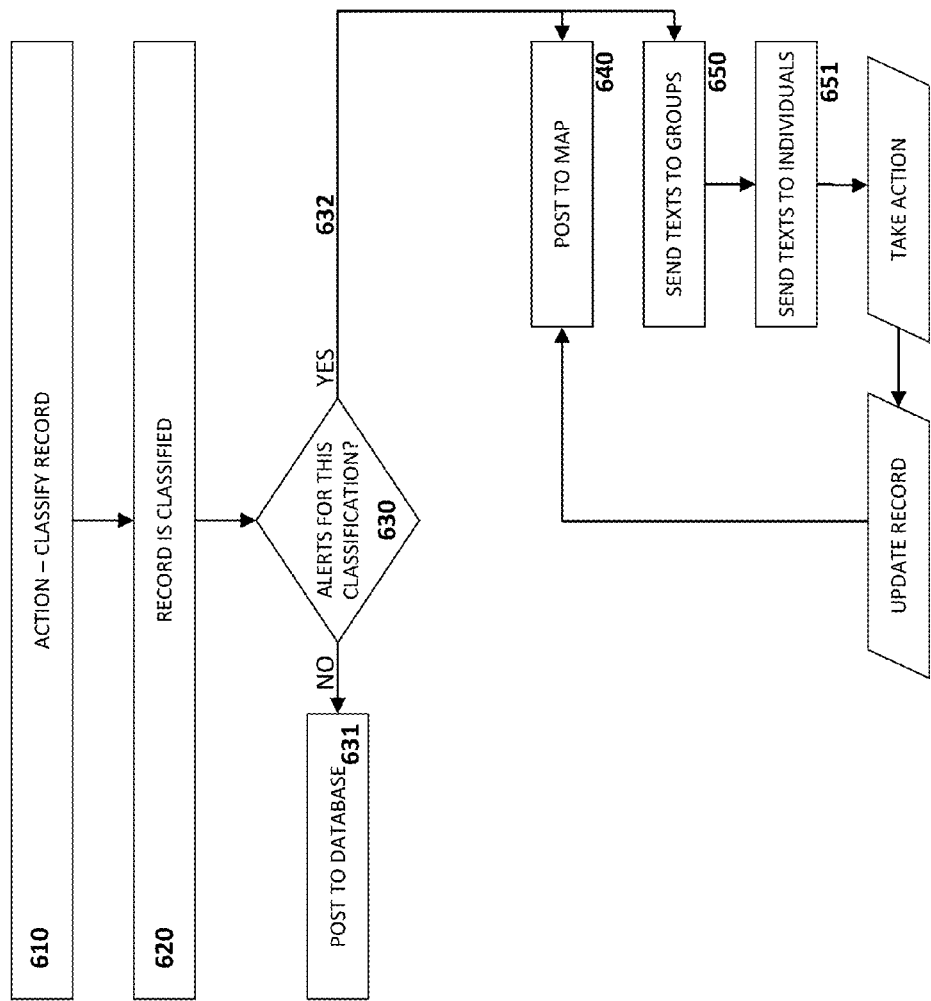
FIG. 6 is a flow chart of the automated forwarding of a completed record of a MOTP to a FROA based upon pre-determined selection criteria.

FIG. 6 is a flow chart further depicting the automated nature of directing completed MOTP records to appropriate individual EOC, and FROA users. Once the MOTP reaches the point in their given ERS session to classify the record 610, the IERCS may execute the classification 620. The IERCS may determine the actions for this classification include sending alerts 630. If no alerts may be required, then the IERCS takes no further action 631, but the MOTP record may be available and searchable by any authorized user. Where alert messages may be appropriate based on the classification actions 632, the IERCS may immediately execute all necessary steps including posting the MOTP record to the map 640, determining which groups should be contacted 650, and send messages to each member of that group 651. The entire process may be automated and the only manual intervention required (depicted by parallelograms in FIG. 6) may be when the recipient of the message takes a deliberate action to access and update the given MOTP record. It is also noted that in some embodiments, the process may be entirely automated, or in some circumstances entirely manual, such as in high care categories, or situations, or small organizations, where localized needs require a human intervention or judgment ability.

Figure 7:
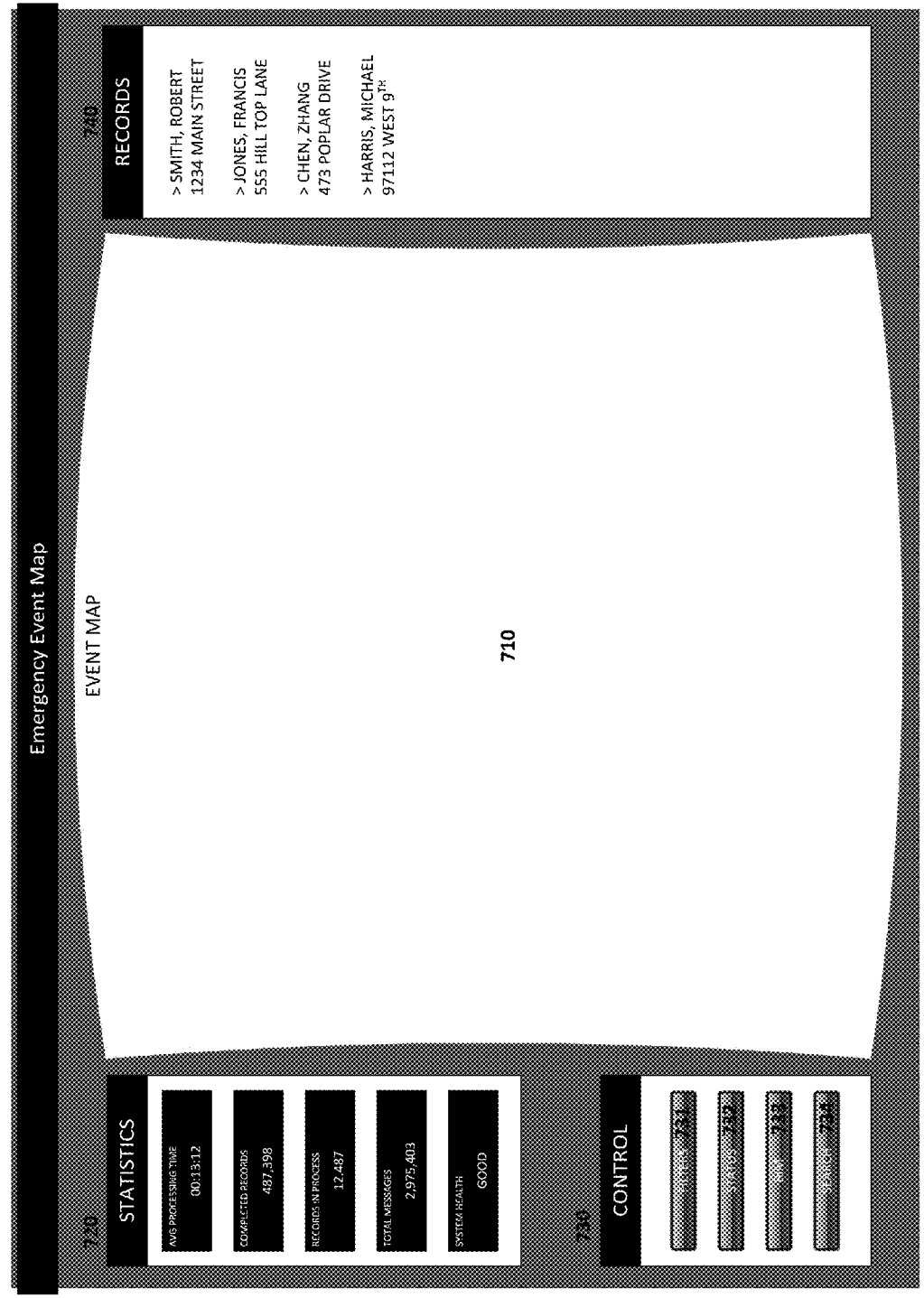
FIG. 7 is an example of a display screen illustrating aspects relating to the emergency event map, including data displayed and various controls to facilitate efficient event response.

FIG. 7 is an example of a display screen of the IERCS interactive emergency event map. This screen may be part accessible via the internet using any internet browsing software or any type of devices, such as any type of computing device or mobile device.

In addition, in some circumstances, the ability may be reproduced over SMS or other cellular network types and protocols, over HAM or other radios such as GMRS, etc., as well over telephone landlines such as being able to be keyed in over touch tone phones, etc.

Generally speaking, this event map would be displayed on a large format digital display within the EOC 50, with individual EOC personnel accessing the IERCS via their individual system-controlled roles and permissions on the EOC computing devices 51, 52, 53. The event map 710 represents a graphically displayed map; generally highlighting the geographic area of concern for the local EOC and for the emergency event at hand. Using standard GUI functions, EOC personnel 440 using any computing device 51, 52, 53 may alter the scale view of this map including, but not limited to, zoom in or out, moving the area of focus, and changing from schematic to satellite view. The map may also include different layers, or filters of which may be brought from other data sources, and of which may be as simple as a navigational map, street map, or political map, or may be more complex such as a topographical map or terrain map. This may be of apparent use such as to pinpoint area where due to the topography, such as an area within a river basin, that may need additional help, or of high risk. In addition, data may be taken from the map, or any other data source, that may include geolocation tagging or otherwise, such that the geolocation may be used to overlay, or provide additional information. In addition, the map may include the ability to overlay data collected, or filters based on the data collected, such that the map may provide for an easy to view actionable information. The view of the map may be simultaneously different for each of the plurality of EOC personnel 440 on their individual computing devices 51, 52, 53 based upon the preference of that given user, as well as by their system-controlled access permissions. This may include the ability to customize display based on the need of the EOC personnel, their proximity to the area or user, and any other reasons, including the display size of the device, orientation of the device, type of the device etc., as well as characteristics of the EOC personnel. The event map 710 automatically displays the results 442, 542 of system-classified MOTP records 433, 540 if the actions for the respective MOTP category 240 include the action to display the result on the event map 252. In addition to the event map 710, the IERCS may also display statistics 720 of the overall activity currently being processed by the entire IERCS, and not just those records that may be currently displayed. These could include Average Processing Time 721 (showing the average total time from when an MOTP record first engages with the system 431 until their record may be classified 433); the total number of Complete Records 722 currently in the system; Records in Process 723; and total Message Traffic 724. The plurality of these statistics 720 provide EOC personnel 440 and the EOC management 420 with a consolidated understanding of the overall emergency event, however the statistics depicted 720 may be exemplary only and used for illustrative purposes of the types of information that could be provided, in addition the statistics may be used to improve the ability of the responders to provide response, such as if a certain response question, which in the past has not been found to be useful for the particular event, but as the current event progresses, a correlation is found, the response and statistics may be used to alter the action responses criteria. These statistics 721 to 724, inclusive, may vary by instance of the IERCS 100 to suit local needs, or by EOC personnel permissions. This exemplary list 720 should not be regarded as exhaustive. While the event map 710 may be intended to display auto-classified records 252, the EOC personnel may adjust the results by altering the settings on their personal computing device 51, 52, 53 by changing the display filters 731 under the control settings 730. The filter settings 731 would allow the user to create any type of filter to change the results on the event map 710. These industry standard filter options allow the user to use the GUI to set geographic boundaries or to create logical queries based upon the questions present in the immediate ERS being deployed 421. An example would be for an EOC person to want to query all of the records for a given residential sub-division because the expected response time to attend to a system-identified 'Critical' case would not be timely, and the EOC person would want to see if there were other citizens in close proximity that might be able to provide assistance. Records that may be currently displayed on the event map 710 as an icon 253 may also be displayed in list format 740 so that the EOC personnel may select a given record and view further detail. An EOC user with appropriate permissions would have the ability to open an MOTP record either by double-clicking a record in the records column 740, or by finding the record as the result of a search of the entire database 734. It is noted that through the active query the EOC may search through criteria, such as critical, based on their ability or action, such as because of their location, so they may prioritize their response. In addition, the query may be immediately updated, such that EOC may be able to see where other EOC are responding, such that multiple EOC may not respond to the same area, if not required.

Figure 8:
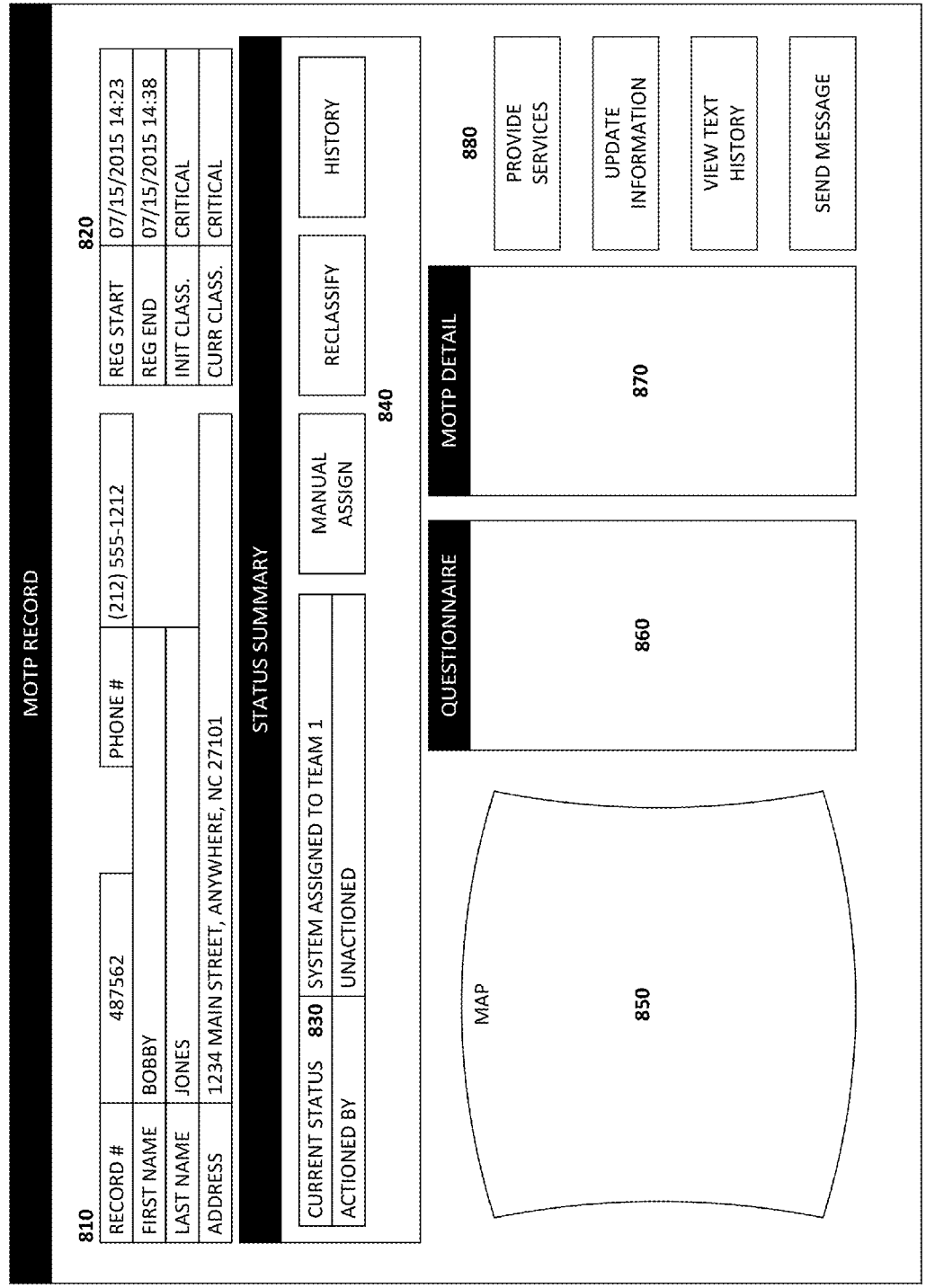
FIG. 8 is an example of a display screen illustrating the components of a completed record of a MOTP, including actionable options.

FIG. 8 is an example of a display screen depicting an MOTP record. Each MOTP record may be a combination of data stored in multiple tables of the IERCS. First, the basic contact information for the MOTP household 810 may be recorded, as may be the initial time that the MOTP interacted with the IERCS 820. Second, the status of the MOTP record may be displayed 830 as the result of the auto-alerts and auto-assignments that may have occurred as part of the classification at the end of the ERS 433, 540. The MOTP record contains several conditions that may be intended to provide the EOC personnel with easy access to all relevant information about this MOTP, including: A map that has the MOTP residence focused in on 850. The questionnaire(s) that was (were) asked of the MOTP, including all of the responses that were received 860. All other data elements of the ERS 360 that were requested of the MOTP, along with the responses that were received 870. In addition, the MOTP record provides the user with action functions to facilitate an improved response. These include: The ability to manually re-classify an MOTP record, or to assign it to a FROA for further action 840, the ability to view, the entire text history between the MOTP and IERCS; update and correct information on the MOTP record; and the ability to record the services that may be provided to an MOTP at a relief center 880. The components and format depicted in the MOTP record are exemplary only, and used to illustrate the information available and capabilities of the IERCS including, but not limited to: Providing a cumulative view of all interactions between the MOTP and the IERCS. Parsing information into appropriate sections. Showing the current status of the record, as well as a history of all automated actions taken; and permitting manual actions and assignments. The capabilities depicted and discussed should not be construed as exhaustive and limiting of the capabilities of the IERCS. Returning to FIG. 7, another control feature 730 that allows the EOC personnel to better engage with the public may be status updates 732. Status updates allow for targeted and specific information to be pushed to specific MOTP, and to obtain responses from them, if so desired.

It is noted that the ability of the system may include the ability to push data and pull data, such as GPS location, from any device connected, such that updates may be sent in any direction, whether upstream or downstream, and such that actionable information, or updates as well as initial notifications may be provided at any time the device is on.

In an embodiment, it is noted that unlike prior art, which are generally closed loops systems, where pre-subscription or download is required, the present invention is intended to be accessible to anyone within an affected area, whether they are currently physically located within the affected area or not. The IERCS system does not require any pre-registration and will initiate an interactive session with any respondent. Each session is an interactive session designed to gather specific information from each individual user and may be pushed to those on a given network, or simply through any method to those in a given area similar to push notifications used in Amber Alerts such as CMAS or WEA. It is noted however, that the present invention provides for the ability to include up and downstream communication and the ability for data gathering from populace to responding systems.

It is additionally noted that unlike CMAS and WEA, that use broad geo-fences, the present invention may allow for precise targeting of MOTP respondents. The application may use geographic boundaries (such as defined city or zip code areas) or free form drawing of target areas down by the user to dictate the area for messages to be broadcast, or through dynamic filters. This may also be done via other methods, such as triangulation or through, for instance, sending the bulk message to any device currently connected on a single or group of antenna, towers or satellites, as well as other predetermined or actively determined characteristics, of either the area, the user, or the specific location or device/networks being used.

FIG. 9 is an example of a display screen of the Status Updates GUI 900 used to send helpful event-related information to a plurality of MOTP tracked by the IERCS. The EOC user would enter a brief description of the event message 910 to help with tracking the information. Next, the audience for this event message would be selected 920. Options could include: All—the application would send the message to each MOTP record in the database for this emergency event. Select Characteristics—these may include locating only those individuals who responded to a question (or plurality of questions) in a manner of interest to the EOC, or select by geography—which would allow the EOC user to user the map to isolate MOTP records using geographic boundaries.

The timing 930 of the message may also be manual controlled. In some instances, the EOC may want to send the message at a pre-determined time, or have it start and end at a pre-determined point, such as warning messages for a predetermined time interval, such as during the estimated duration of a storm. The options described here are exemplary only and may be shown to depict the flexibility of sending status updates to the public.

An essential capability of the IERCS is to facilitate interactive communications. As such, the EOC User may need to know how many people may be expected to receive the message and how many have actually received it. Based upon the audience settings 920, the IERCS may display the number of MOTP that are projected to receive this message 960 (based upon the audience selection criteria). This may include both automatic message authentications by the message system of the user's device, or may include a manual entry or authorization of the read message, such as requiring the user who received the message, to scroll through the message and type or input a response, such that the message confirms it has been read. The IERCS also allows the EOC User to request acknowledgements 940 that may be appropriate. These results may be displayed in summarized format 970 so that the EOC may see the efficacy of the status alert messages. All status alert messages 950, along with any responses, may be written to the permanent MOTP record in history.

In some embodiments, there may be times within the emergency event that more information from the public may be desired. This may be due to a changing event, or more information that has become of interest to the EOC. The Bulk Interactive Message (BIM) option 733 on the Emergency Event Map screen 700 allows an authorized EOC User to begin a mass dialogue with the entire population. This may include the ability to have two way communications, or through the response in other areas of the application, or in the real world, may be provide the basis for the communication.

FIG. 10 is an example of a BIM GUI display screen 1000 that may be shown when the EOC User selects the BIM option 733. As with status updates, a brief description may be entered 1010 and the audience may be selected 1020. The type of response provides the EOC with easy options to tabulate results across a broad range of users. Examples of response types may include: POLL—these may be YES/NO, RANGE, or LIST type questions that may be being asked to the population. For example, in a flood emergency the user could be asked "how much standing water is in your basement" or "how many stories do you have in your home?" Responses of "1 story" may be of higher importance to the EOC because those users cannot safely get to higher ground. ACKNOWLEDGE—this could be a request from the EOC to have the MOTP respond to, such as "do you have transportation?" or "are you able to evacuate?" QUESTIONNAIRE—based upon changing emergency event conditions, more comprehensive information may be requested from the public.

In this case, the EOC may need to construct another questionnaire, see FIG. 2A, along with complete automatic alerts and classification. In this case, the EOC user would select a response type of Questionnaire 1030 and build the questionnaire, as described under FIG. 2A. Once the audience is selected 1020 and the BIM Type 1030 is set, the user enters the initial message 1040 that the MOTP may receive. Based upon the audience parameters, the total number of expected sessions may be displayed 1050 so that the EOC User may adjust the audience selection parameters if they wish to adjust this number to either expand or contract the reach. As the MOTP begin to respond to the BIM, the response statistics may be summarized 1060 so that the EOC User may easily see the efficacy of their message.

Figure 11:
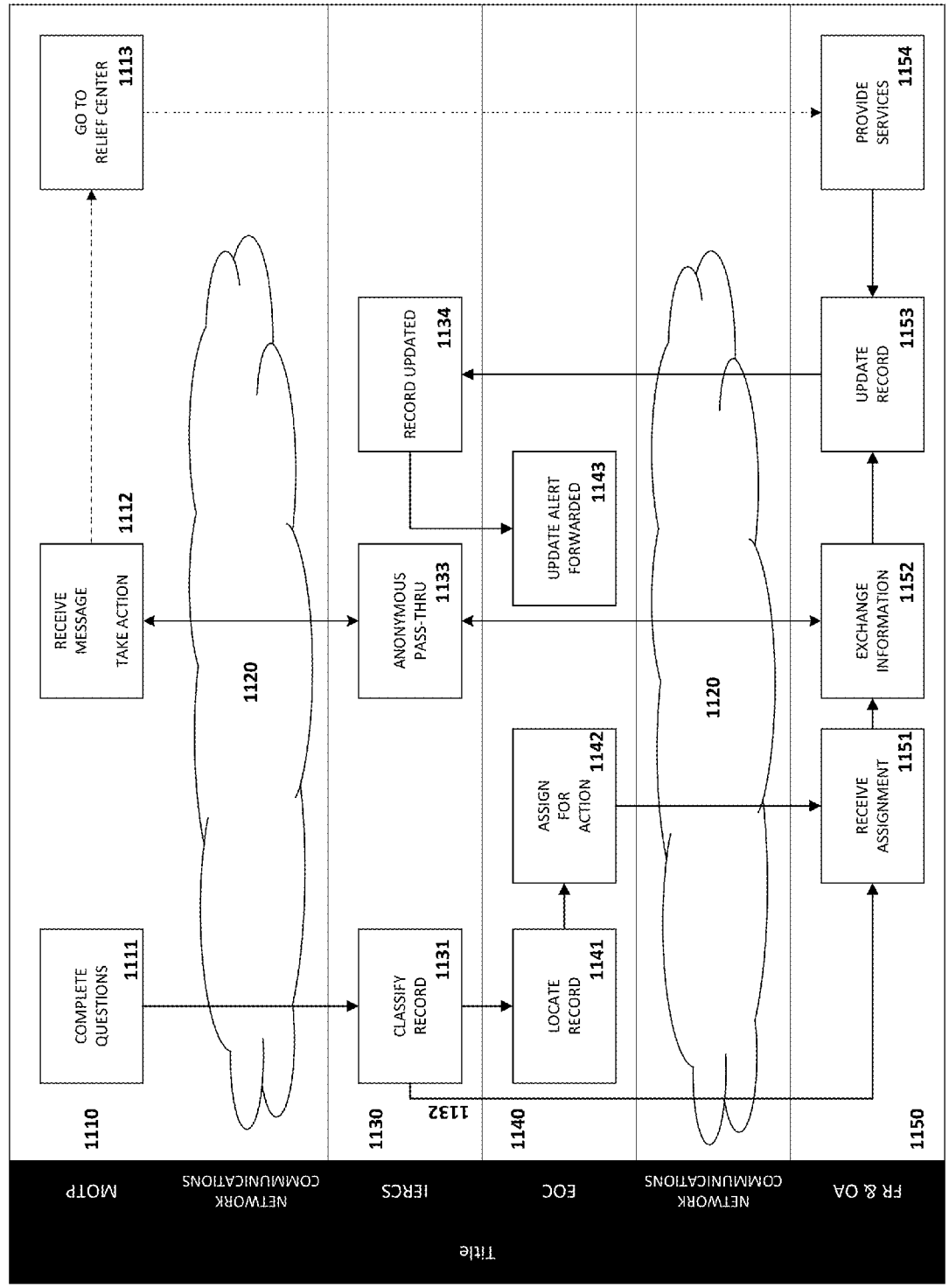
FIG. 11 is a diagram of the process flow of the manual assignment of an MOTP record to a FROA and the interactions between those parties as it may be facilitated by the IERCS.

Finally, there may be instances in which the MOTP record becomes of sufficient interest to an EOC user that they want to directly assign a First Responder or Outside Agency to directly interact with the MOTP to provide assistance. FIG. 11 represents a diagram of the various parties and their interaction during an emergency event using the IERCS. As shown in FIG. 4, the interaction between the MOTP and IERCS may be mostly automated, and the goal may be too quickly and efficiently classifying completed MOTP records and direct them for action, with as little human or manual interaction as possible. Not all completed MOTP records 1111 may generate a classification 1131 that may warrant an auto alert 1132 to either EOC Users or First Responders, but the EOC User may determine upon monitoring of the emergency event that the MOTP does require intervention. An example of this could be a wildfire situation where the MOTP has reported that they do not plan to evacuate under any circumstance.

In this case, the forced evacuation may become warranted and the EOC User 1140 would identify the MOTP record(s) 1141 and assign the record for action 1142 using the MOTP assign function on the MOTP record 840. These records may be stored for any period of time, and may also be placed as confidential, except for the responding EOC where the government or agency does not have a stored list of those refusing evacuation as to follow state or federal laws. In addition, this data may be stored locally on the user's device, such that when the mandatory evacuation is placed, data may be sent to the user's device, and from there the device may remind the user of the mandatory evacuation, as well as send to the EOC, the refusal of mandatory evacuation. Assigned records may be placed in the outbound message queue 533 and transmitted over commercial communications networks 1120. Wherever a connecting line between any two parties traverses the cloud depicted in the network communications lane diagram 1120, it may be to represent that the communication are not handled by the IERCS. Once the First Responder or Outside Agency receives their assignment 1151, such as "Evacuate MOTP located at XXXX as necessary." The FROA may proceed to that location, or may reach out to the MOTP to engage in communications with them directly. In this case, the information from the FROA 1152 may be transmitted to the MOTP via the IERCS via an anonymous pass-thru 1133. The pass-thru may be shown in further detail on FIG. 5 as rectangle 534 and serves the purpose of removing the contact phone number of the responding FROA from view of the MOTP and to protect the FROA from direct communication from the MOTP in the future. As the FROA sends a message to the MOTP 1112, the FROA contact information may be converted to a 'session' in the pass-thru which may then put it into the generic outbound queue 533 for transmission to the MOTP. Once the response message from the MOTP may be received in the inbound queue 531. It may be recognized as a unique session and directed to the pass-thru 534 for forwarding to that specific FROA 1152. Here, the single inbound queue 531 on FIG. 5 may represent a plurality of queues handing multiple sessions between a plurality of MOTPs and a plurality of FROAs. The communication between the FROA 1152 and the MOTP 1112 may be completely free-form and natural language, and may extend for as long as may be warranted. It is noted that the communication may be transmitted as a base language, of which may be compiled one each device and transmitted, or the compiling may be done at the network node such is in a cloud computing array. However, as long as the communication between the FROA and MOTP passes through the IERCS 1133 the communication may also be recorded as part of the MOTP record history. Once the FROA has completed their actions they may update the MOTP record 1153 which may update the status 1134 and may notify the originating EOC user 1143, if so requested.

The interaction between the FROA 1152 and the MOTP 1112 may include instructions to proceed to a relief center. Once the MOTP proceeds to the Relief Center 1113, they may engage with a FROA 1154 who may be different from the FROA that was in communication 1152 with MOTP. This face-to-face interaction may be outside of IERCS, and may be represented as the dashed line between the MOTP 1113 and the FROA 1154. If the Relief Center is equipped with access to the IERCS, an authorized FROA may access the MOTP record 800, 1153 and annotate the record with any/all services provided 880. It is noted that the aforementioned actions may also be instead outside of the application and may include face-to-face, geolocation changes, or any other types of real-world actions. Some of these actions may not have the ability to be updated within the application automatically or by characteristics of a sensor, device location or network change for example, but may be able to be updated via questionnaire, response or other input devices, such that the EOC and other user's may be able to be updated of the changing characteristics or locations via input device or via entering the data into a device to update the record or records.

The capabilities discussed as part of the IERCS have been focused on communications during a large scale emergency event when the EOC has needed to gather information quickly from a plurality of unknown MOTP, but may also be applied towards any combination of know or unknown MOTP and the actors aforementioned.

Although the examples discussed within this document have been in regard to an emergency event, the application could be adapted to any situation where a single entity wishes to engage in an immediate dialogue with a broad range of unknown people. Examples of other uses of the IERCS architecture include: Mass marketing—where an advertiser may wish to engage an audience with some type of interactive survey, such as at a large sporting event. Large venues often have audiences approaching 100,000 who represent a "captive" audience. Engaging the audience through innovative SMS communications could direct respondents toward follow-up communications. Political polling—the development of a questionnaire would allow for polling of tens of thousands of persons immediately across a very broad spectrum and eliminate the need for a call center and greatly increase the rate at which results may be tabulated. Interactive television experience—broadcasters could allow users to interact with a show in real time to allow the user to ask about products, services, clothing, or furnishings highlighted on the program. That the immediate discussion has focused on emergency communications should not be construed as the limitation of the possible application of the invention.

It is noted that in addition to the above, any other application of the present invention may be noted wherein an organization, agent or otherwise may be able to take advantage of the present invention architecture, where there is a group that necessitates a response from a larger or organization, and wherein the organization has different characteristics or traits to provide the proper response, and as such the present invention may provide.

Although the present embodiments have been described with reference to specific example embodiments, it may be evident that various modifications and changes may be made to these embodiments without departing from the broader spirit and scope of the various embodiments. It should be understood by one of ordinary skill in the art that the terms describing processes, products, elements, or methods may be industry terms and may refer to similar alternatives. In addition, the components shown in the figures, their connections, couples, and relationships, and their functions, may be meant to be exemplary only, and may be not meant to limit the embodiments described herein.

A number of embodiments have been described. Nevertheless, it may be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments may be within the scope of the following claims.

It may be appreciated that the various systems, methods, and apparatus disclosed herein may be embodied in a machine-readable medium and/or a machine accessible medium compatible with a data processing system (e.g., a computer system) and of which may be in any form including transitory, non-transitory or persistent data systems, as well as may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method for interactive emergency response communications, wherein
   a primary user:

creates at least one Emergency Response Scenarios related to a type of emergency event likely to occur in an area served by an emergency operations command where the Emergency Response Scenario is comprised of at least one of:
Standard Elements,
Questionnaires,
Standard Actions,
adds a keyword required to activate the Emergency Response Scenario upon receipt of a message,
a system and database:
receive at least one message including at least one keyword from a member of the public,
analyze the message to determine correspondence between at least one keyword and the active Emergency Response Scenario in a database, wherein the database includes a plurality of Emergency Response Scenario entries, each containing existing procedures about a corresponding event,
create or update a member of the public record in the database with new information,
transmit a first requested scenario component,
receive a subsequent response from the member of the public and analyzes for response values,
continue an undetermined number of communication actions until such time that a response to the final data element is received according to the scenario,
classify the record according to defined categories based upon the combination of responses to the questions within the Emergency Response Scenario,
creating the Questionnaire by:
creating a unique Questionnaire record,
defininga classification categories for the given Questionnaire,
adding at least one question to the Questionnaire record,
defining a response type for the given question,
defining an acceptable response value for each question,
defining, for each category, the response value that corresponds to each category, where:
the response value can be described as a value,
the response value can be a logical statement,
each acceptable response value falls within one or more categories,
adding, where desired, a sub-question for any category corresponding to an acceptable response value,
adding as many questions, or sub-questions, as deemed necessary for this Questionnaire,
adding, where desired, the question value in another language,
defining, for each category, the actions to be processed automatically for member of the public record that has completed the Questionnaire and corresponds to one of the categories, where a completed record can be a member of only one category,
creating a sequence of the scenario components, compromised of at least one of:
Standard Data Elements,
Questionnaires, and
Actions.

2. A method, in addition to the method found in claim 1, wherein:

the system and database at any point are able to transmit to all or a subset of all members of the public, based upon selected filters, messages related to the emergency event, including:
status messages and alerts,
additional interactive messages and Questionnaires identified as needed information,
notifying emergency response personnel of assignments based upon automated, pre-configured rules.

3. A method, in addition to the method found in claim 1, wherein the system and database after receiving communication from the member of the public:
return to the member at least one of:
a prompt for information for a requested data element,
a response to the answer to the previous question to the member of the public, the subsequent requested data element,
a first question of a Questionnaire,
receives, from the member of the public, further responses,
analyzes the responses received from the member of the public and determines if the answer received is an acceptable response value for the given question, and if the response is non-compliant, then:
returns to the member of the public a message informing of non-compliance and re-transmits the question,
returns to the member of the public, the next logical question within the Questionnaire,
proceeds sequentially through the entire Emergency Response Scenario, transmitting data to, and receiving information from, the member of the public, until such time that all components of the Emergency Response Scenario has been completed,
executes predefined actions, which are processed within an individual subroutine, the completion of which are not be required for the next emergency response component to be initiated, including:
classifying member of the public records based upon their priority categorization, where present for the given Emergency Response Scenario,
posting the member of the public record to a dashboard display in the shared situational awareness user interface,
notifying emergency operations command and first responder personnel of member of the public records based upon predefined alert characteristics,
assigning to first responder and outside agency personnel, member of the public records that meet specific predefined characteristics requiring immediate attention,
executes the Emergency Response Scenario for each record of each member of the public, wherein each member of the public is able to be at various stages of the Emergency Response Scenario, simultaneously,
records to the database record, all activity, including both automated and manual functions, associated to a member of the public for at least the duration of the event,
updates the member of the public record with any associated data and actions including date and time stamps, message content, etc., determines which category the combination of all responses the member of the public record belongs to, records the classification to the database, executes defined actions for the Emergency Response Scenario appropriate to the category for the given member of the public record, determines or receives a location for a plurality of members of the public based upon information received during the completion of the initial Emergency Response Scenario or via the devices or network, displays, to a member of the emergency operations command, first responder, or member of an outside agency, the location of a at least one of a plurality of the members of the public respondents on at least one of the user devices or dashboard display, based upon user-defined filter or selection criteria, receives from a member of the emergency operations command, first responder, or member of an outside agency, additional data to update the database record for the specific member of the public until the event is completed or the member of the public is classified as having no further need.

\* \* \* \* \*